Nov. 30, 1965 H. KUMMERMAN 3,220,571
SELF-CONTAINED CARGO HANDLING APPARATUS FOR
SHIPS, VEHICLES AND STATIONARY PLANTS
Filed Aug. 5, 1963 17 Sheets-Sheet 1
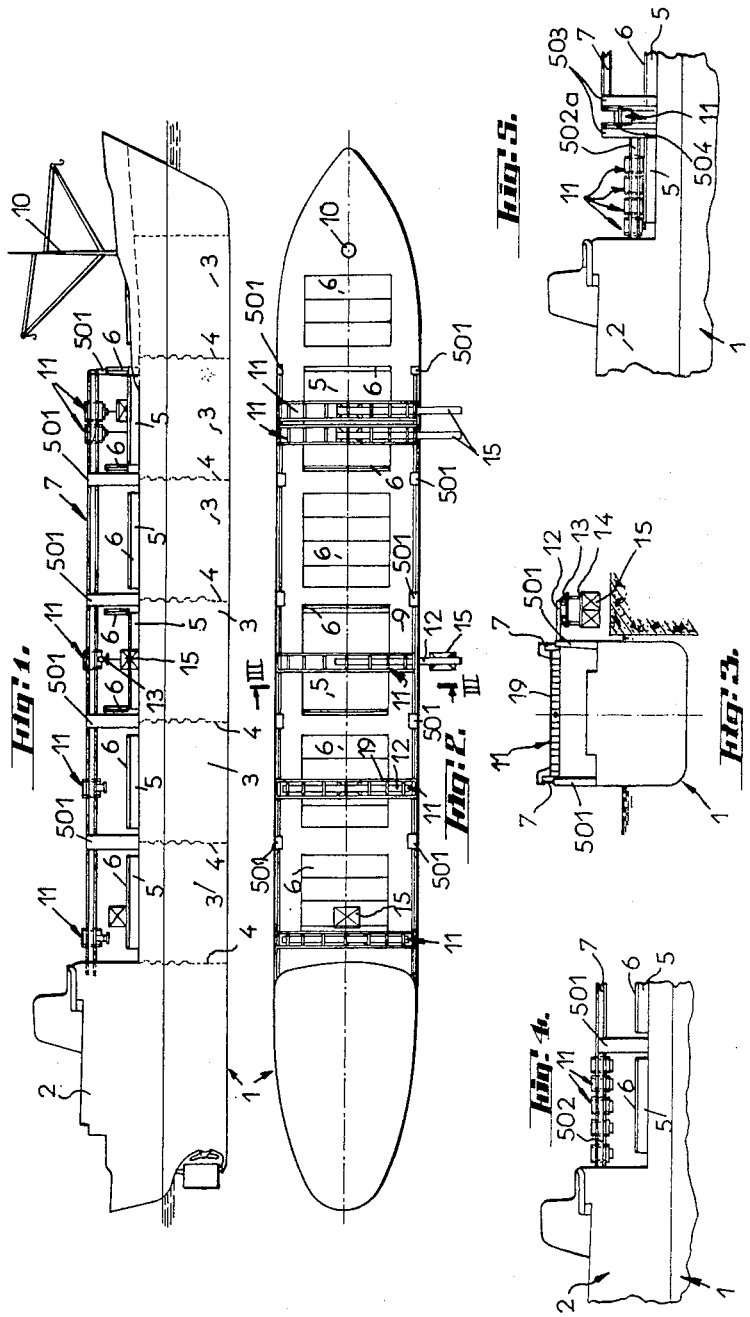
INVENTOR
HENRI KUMMERMAN
BY
Kenyon & Kenyon
ATTORNEYS

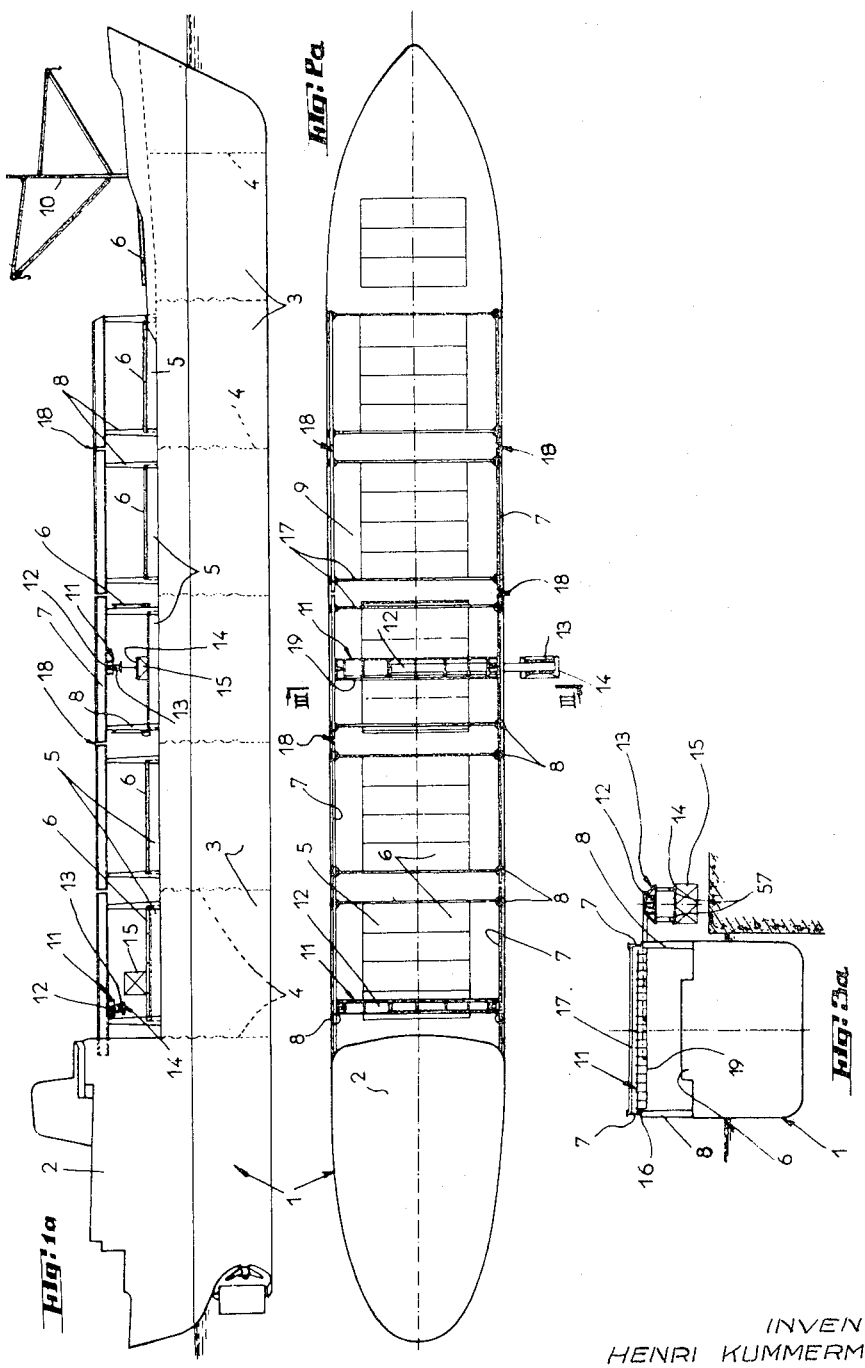

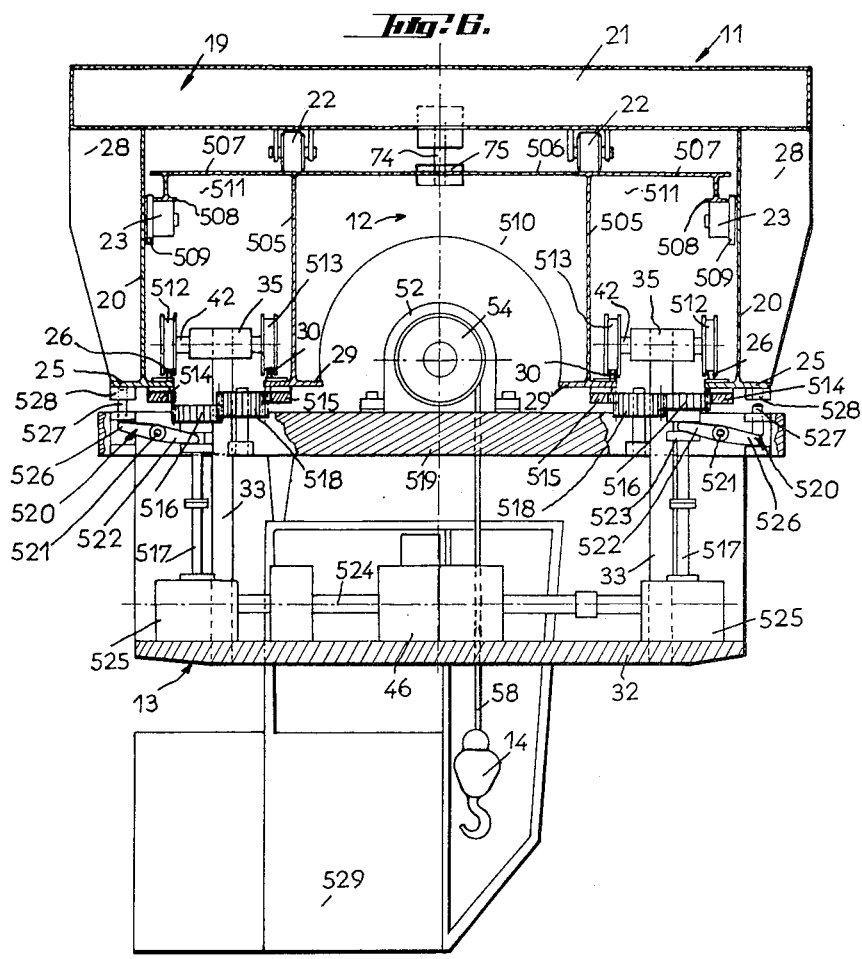

Nov. 30, 1965  H. KUMMERMAN  3,220,571
SELF-CONTAINED CARGO HANDLING APPARATUS FOR
SHIPS, VEHICLES AND STATIONARY PLANTS
Filed Aug. 5, 1963  17 Sheets-Sheet 4

INVENTOR
HENRI KUMMERMAN
BY
       Kenyon & Kenyon
          ATTORNEYS

Nov. 30, 1965                H. KUMMERMAN                    3,220,571
               SELF-CONTAINED CARGO HANDLING APPARATUS FOR
                     SHIPS, VEHICLES AND STATIONARY PLANTS
Filed Aug. 5, 1963                                    17 Sheets-Sheet 5
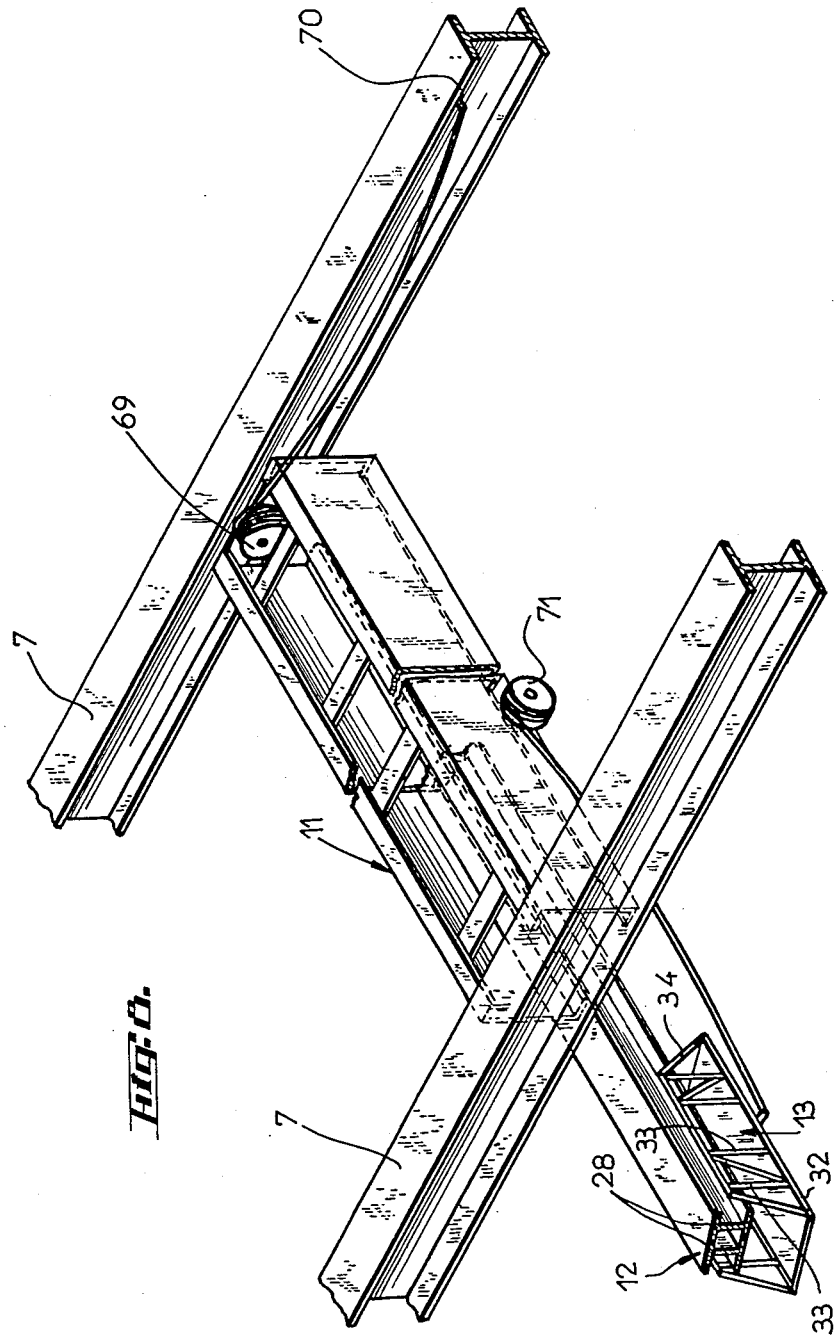
INVENTOR
HENRI KUMMERMAN
BY
Kenyon & Kenyon
ATTORNEYS

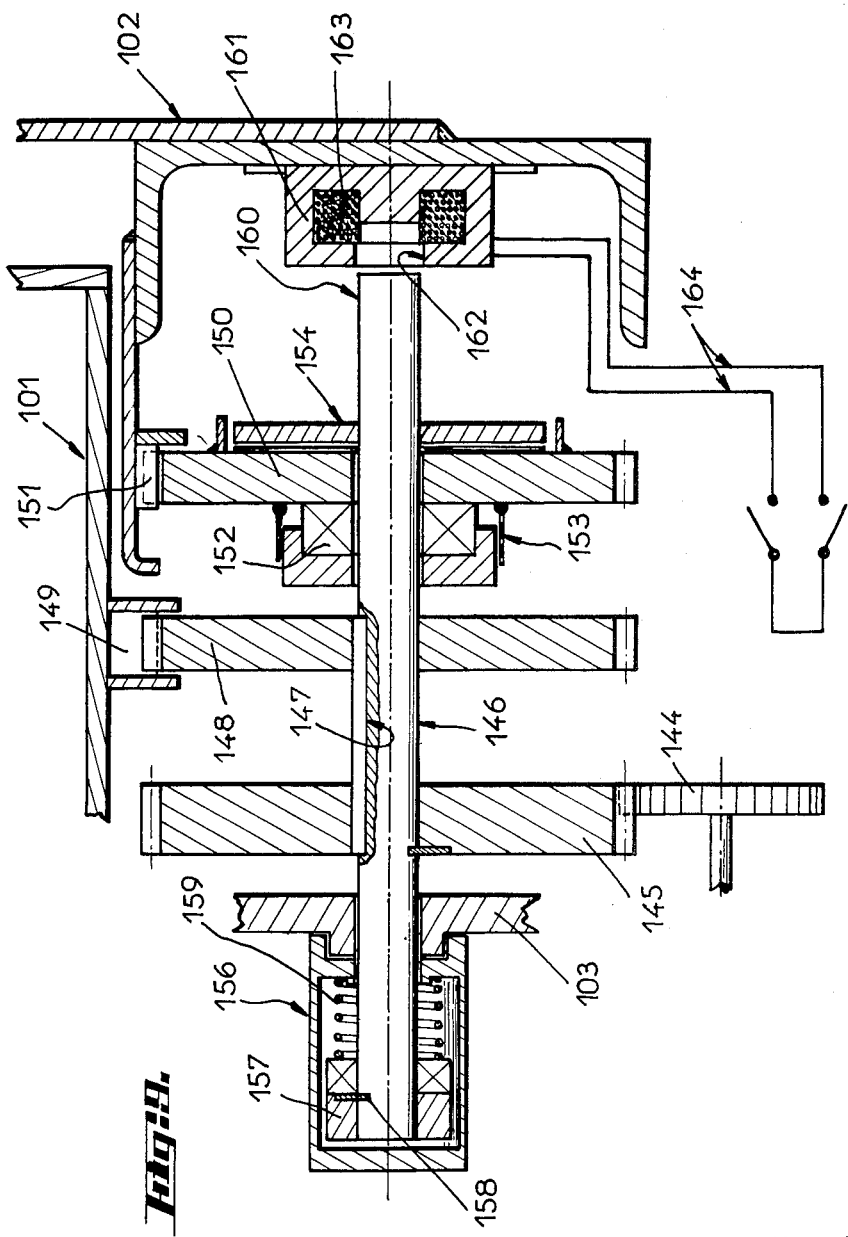

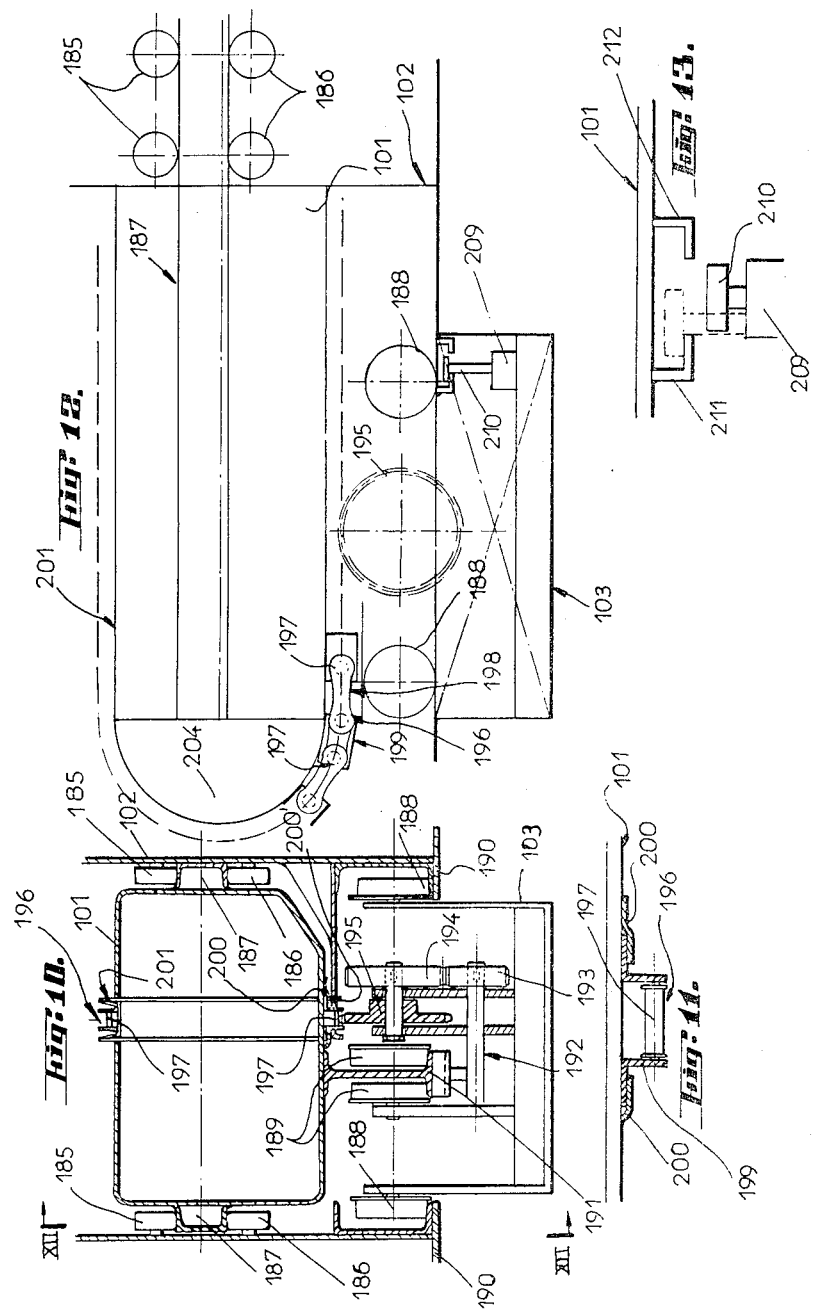

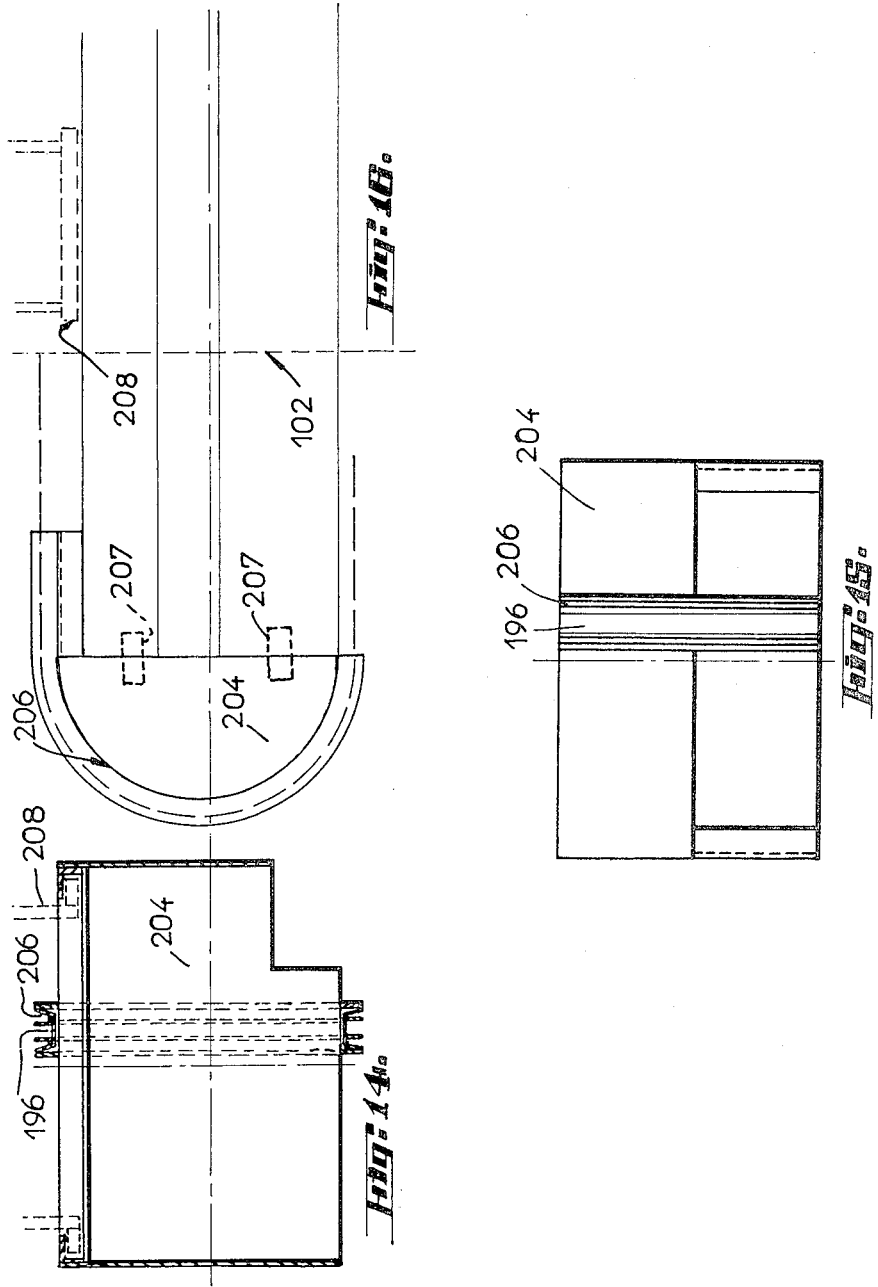

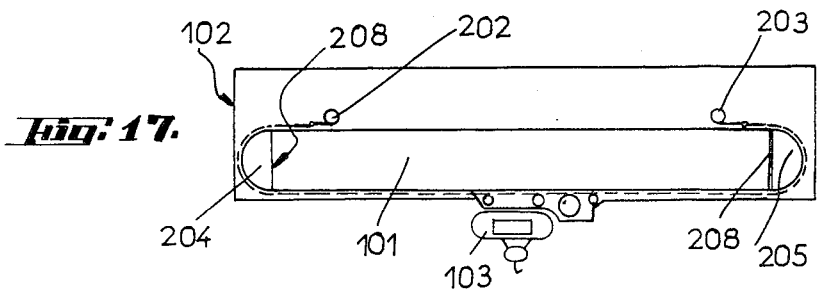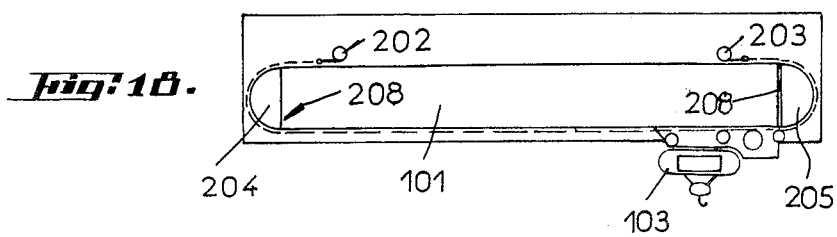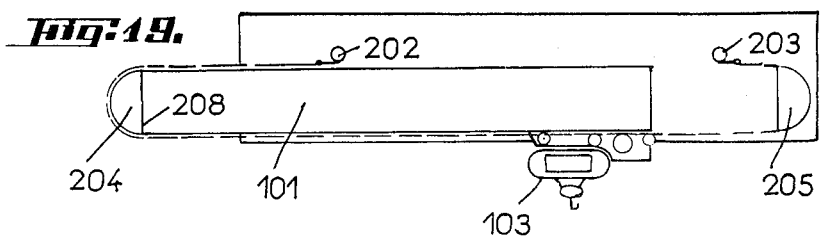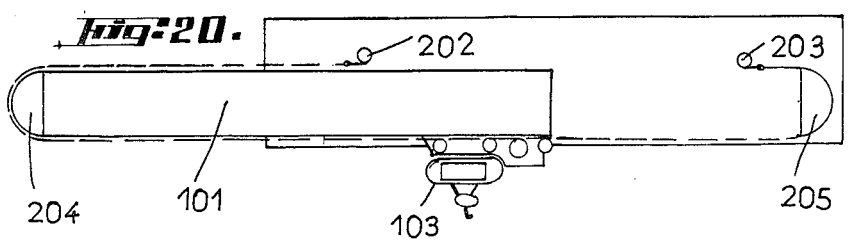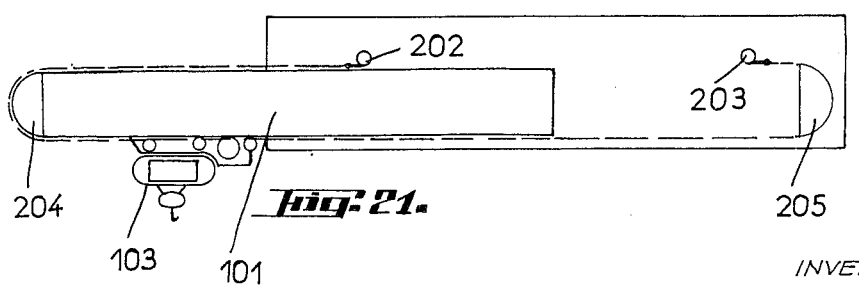

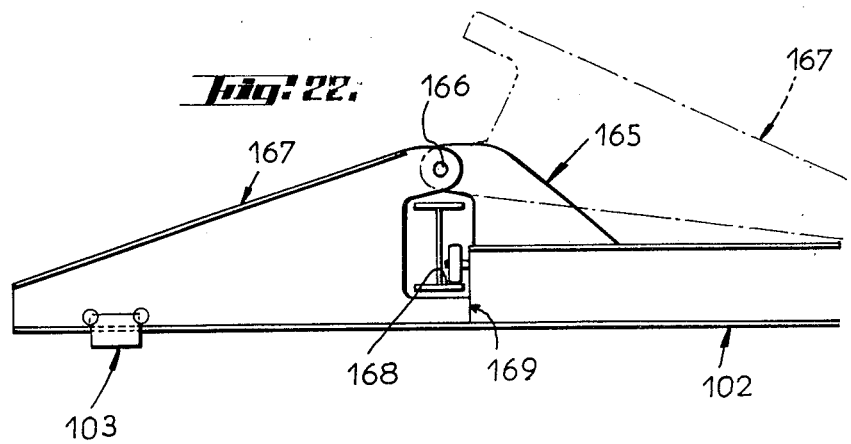
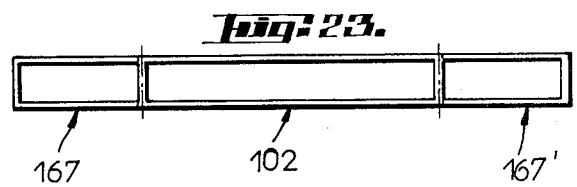
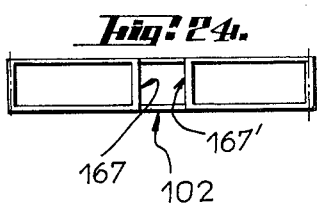
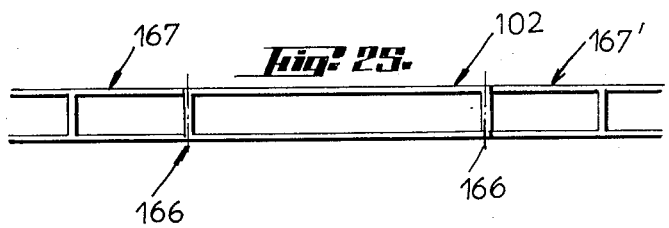
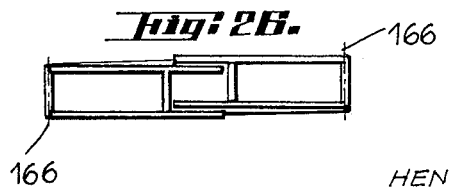
INVENTOR
HENRI KUMMERMAN
BY
ATTORNEYS

INVENTOR
HENRI KUMMERMAN
BY
ATTORNEYS

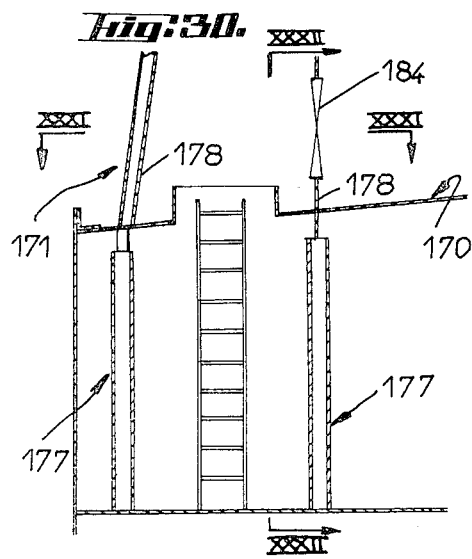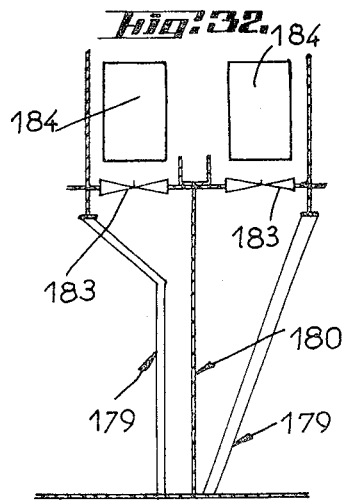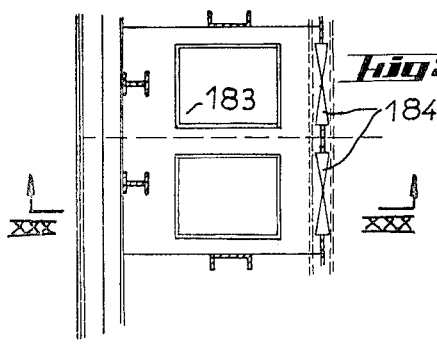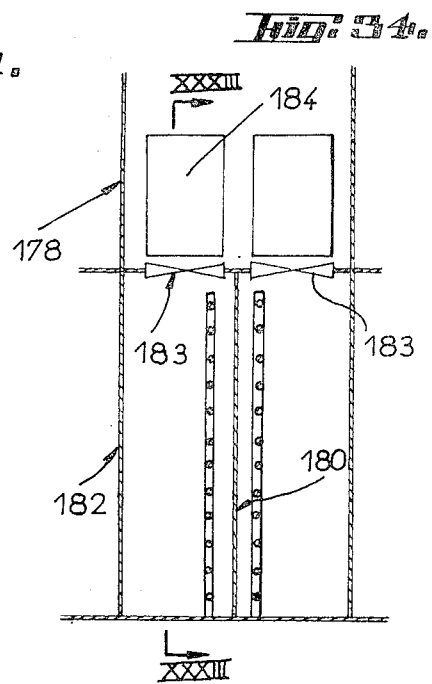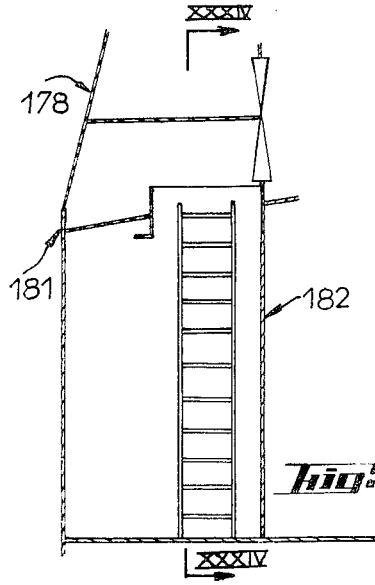
INVENTOR
HENRI KUMMERMAN
BY
Kenyon & Kenyon
ATTORNEYS

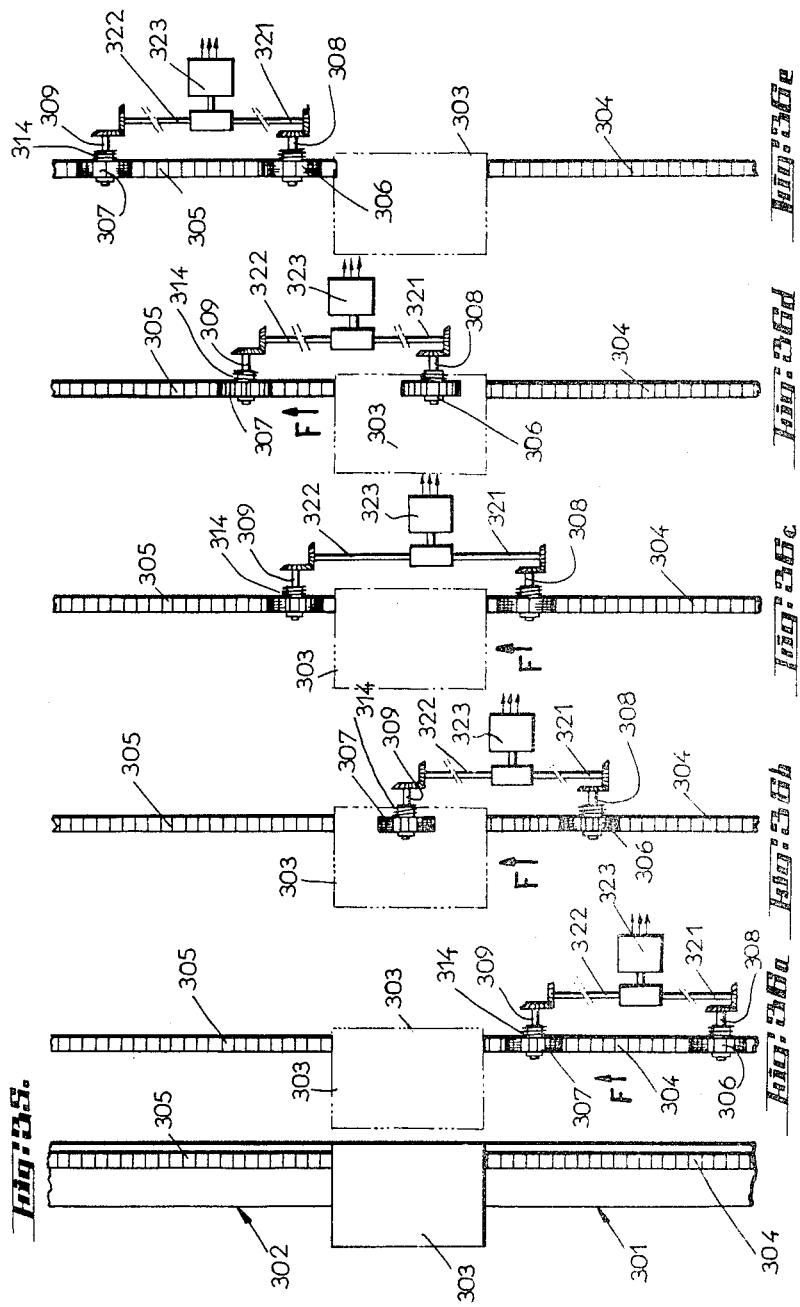

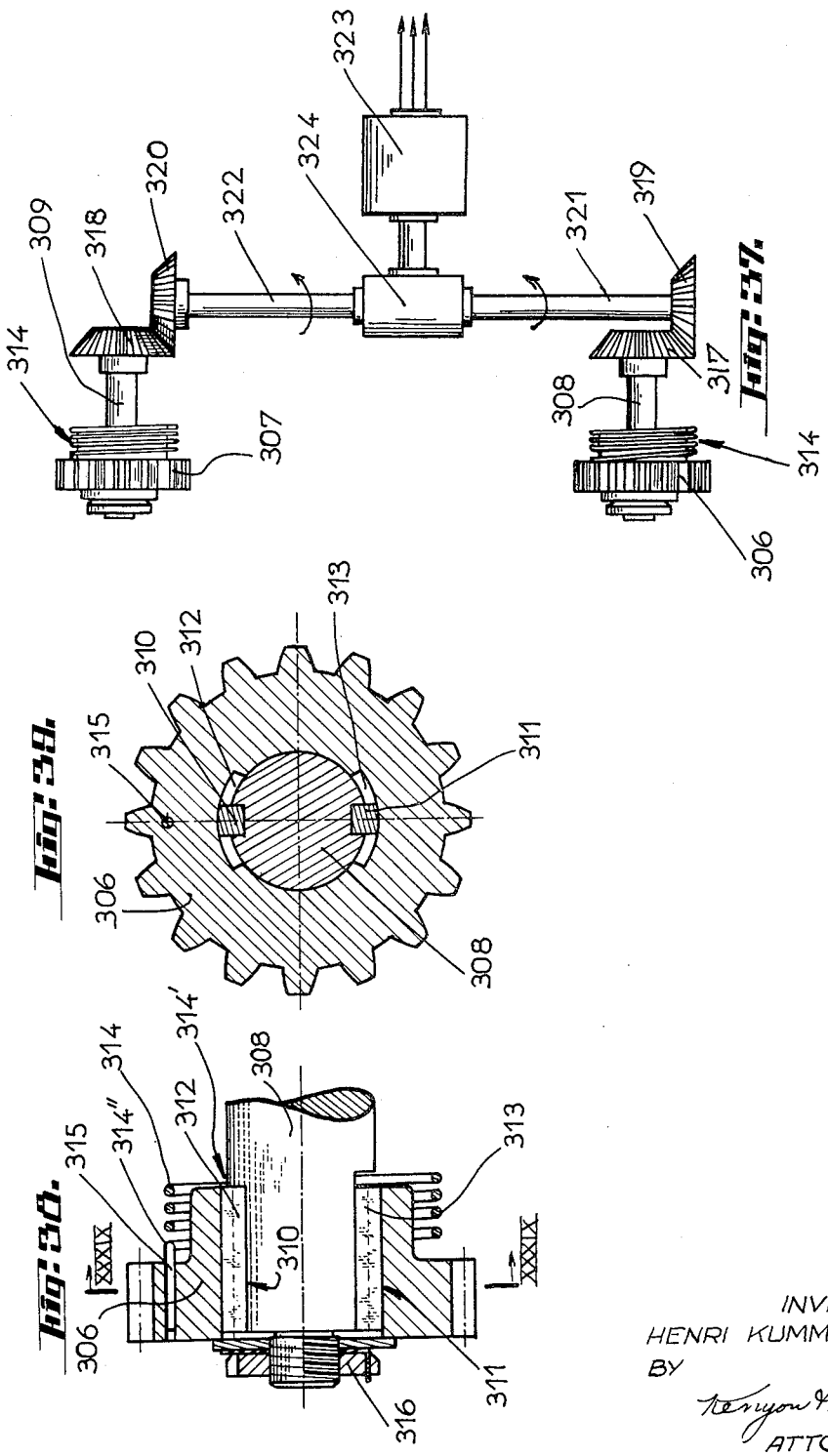

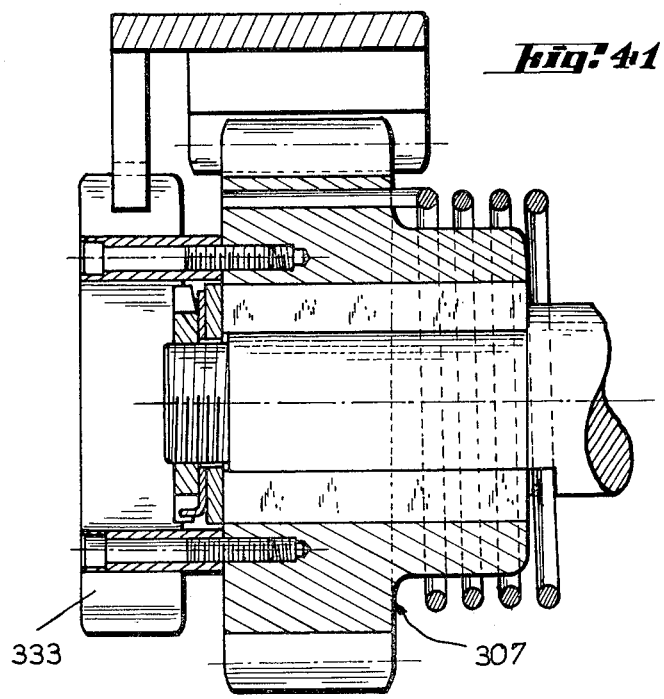
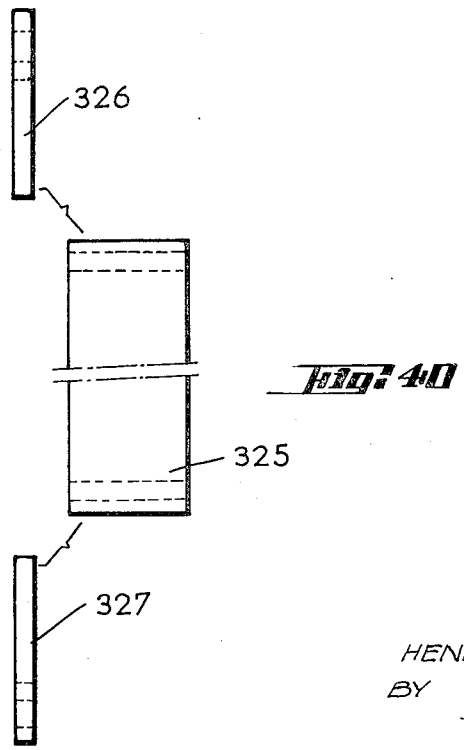

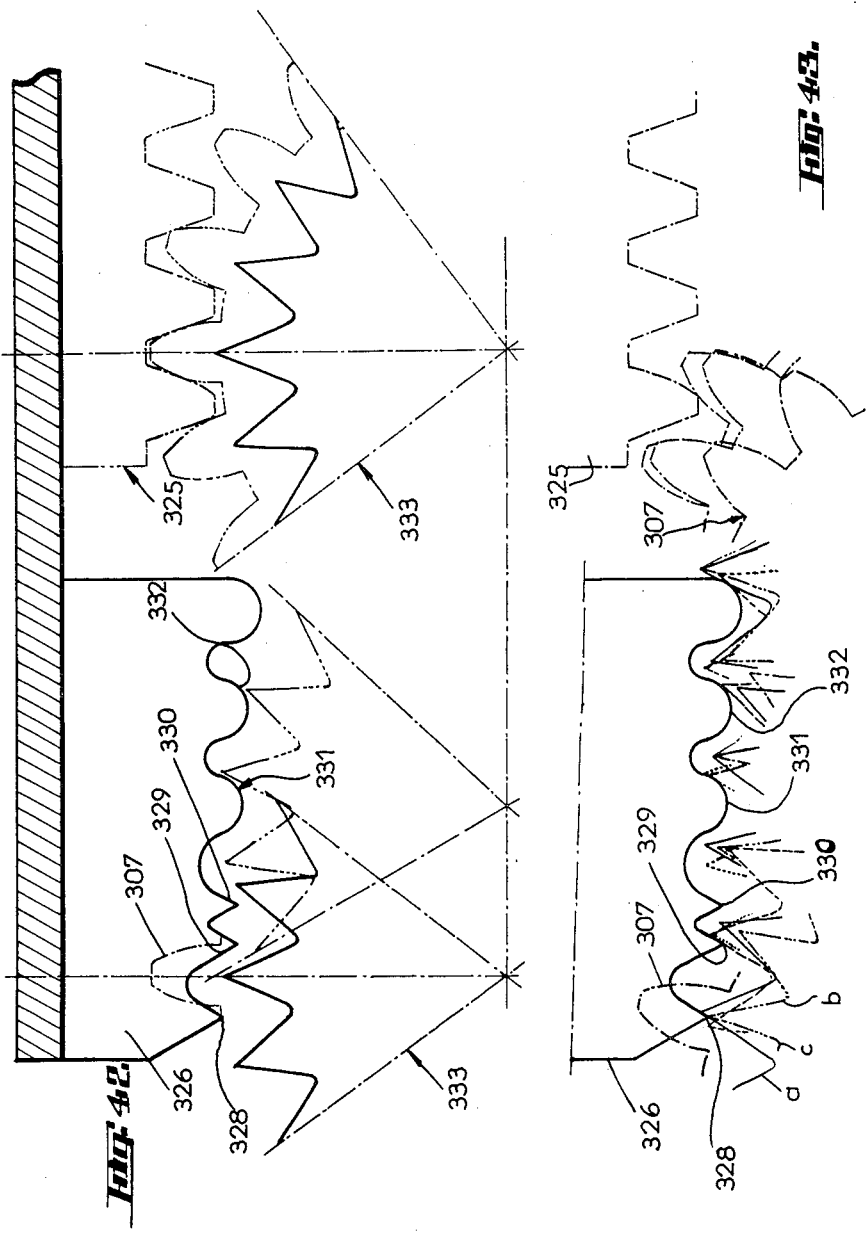

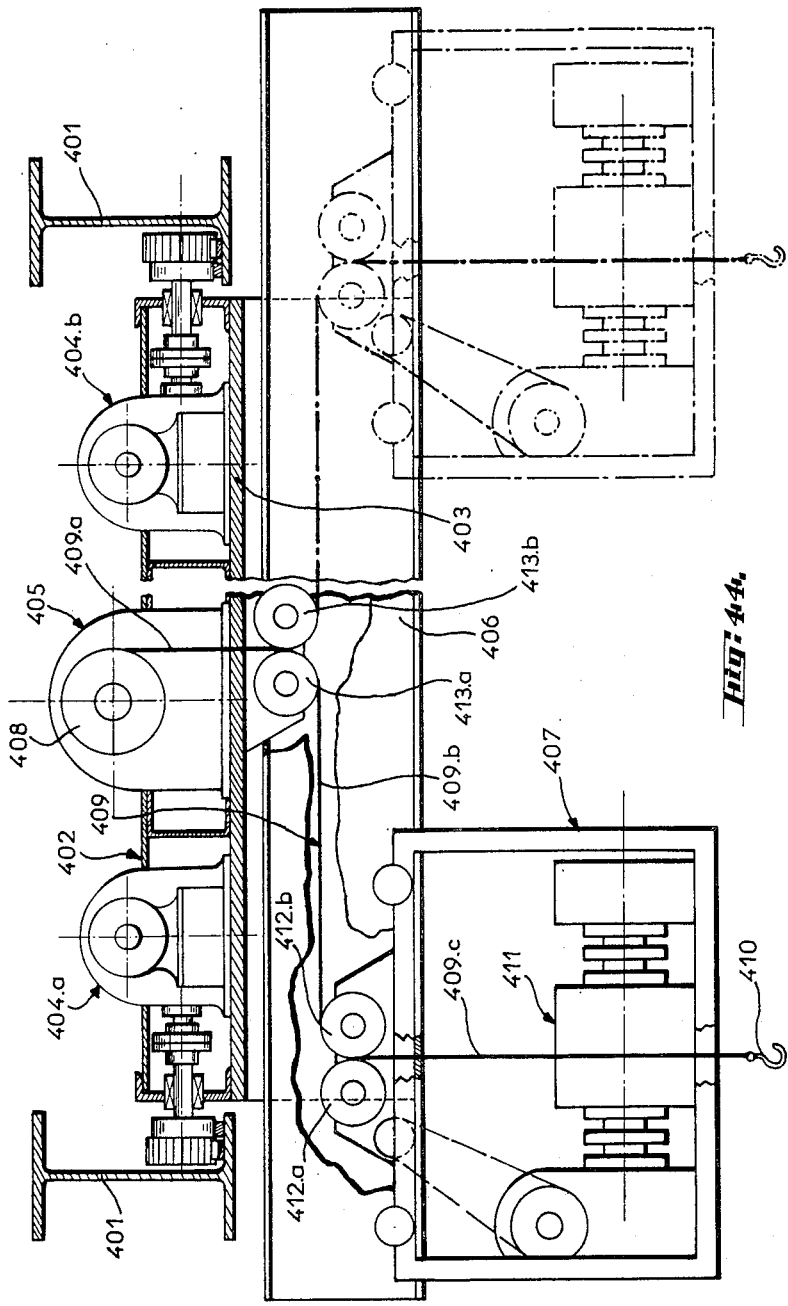

3,220,571
SELF-CONTAINED CARGO HANDLING APPARATUS FOR SHIPS, VEHICLES AND STATIONARY PLANTS
Henri Kummerman, Paris, France, assignor to MacGregor-Comarain, Paris, France, a corporation of France
Filed Aug. 5, 1963, Ser. No. 299,963
Claims priority, application France, Aug. 16, 1962, 907,092; Dec. 29, 1962, 920,189; Mar. 5, 1963, 926,940; May 31, 1963, 936,792; July 8, 1963, 940,761
30 Claims. (Cl. 214—15)

It is the essential object of this invention to provide an improved loading and unloading device constituting a permanent equipment for example on the upper or weather deck of ships or the like, as well as on rolling vehicles, in buildings or other fixed installations, the present invention being also concerned with the ships, vehicles, buildings and fixed or movable structures or constructions equipped with devices of this character.

The device according to this invention is applicable more particularly to ships and is of the type comprising one or more overhead or travelling cranes. It is remarkable notably in that the crane runways or tracks extend substantially throughout the useful length of the ship's upper or weather deck, on either side of at least one row of hatchways, with a relative spacing sufficient to permit the loading or unloading through preferably substantially the whole of the successive hatchways provided in said deck.

According to another feature of this invention, the aforesaid runways or tracks, disposed substantially plumb with the ship's plating, are supported by bearing members consisting of posts preferably rigidly incorporated in the hull structure in which they are for example firmly fitted. On the metallic frame structure thus obtained are adapted to move one or a plurality of travelling cranes the number of which may if desired equal that of the hatchways to be served. Each travelling crane consists of a main frame or chassis structure constituting for example a transverse compound beam supported and guided by said runways or tracks along which it is adapted to move by rolling in the direction of the longitudinal axis of the ship. The chassis of the travelling crane carries a telescopic girder extending athwartship and adapted to move along its axis so that it can be brought to an overhanging position overboard above the point where the loads are to be transported to or from the land, a quay or another ship moored alongside. The aforesaid telescopic girder carries at least one crane crab equipped with hoisting means and adapted to travel along said telescopic girder.

According to a further feature characterizing this invention each runway or track aforesaid is supported laterally in alignment with each gap provided longitudinally between adjacent hatchways by at least one of said posts disposed preferably in the substantially axial transverse plane of said gap and substantially plumb with a transverse hold bulkhead. It may be noted that the height of the posts supporting said runways or tracks should be practically equal to at least the sum of the following dimension:

Height of the coaming headledge,
Height of the hatchway closing panel,
Height of the load to be hoisted,
Height or thickness of the hoisting member from which the load is to be suspended,
Distance from the bottom of the transverse crane crab to the bottom of the runways or tracks.

The framework of the device should be so designed that it will not interfere with a certain longitudinal flexion of the ship as a whole, so that, according to a complementary feature of this invention, the aforesaid runways or tracks may comprise, at predetermined locations, gaps or breaks permitting the ship's deformation or distortion as a consequence of its longitudinal flexion.

In a modified embodiment, and according to another feature of this invention, said runways or tracks may be provided with relatively sliding connections with at least some of the aforesaid posts to permit the flexion of the ship.

According to another feature of this invention, the aforesaid travelling crane arrangement comprises means whereby the aforesaid travelling crane crab can move continuously from one free end of the aforesaid telescopic girder in its outermost overhanging outboard position to the opposite end of the aforesaid main frame structure of the said travelling crane, and vice-versa, by being supported, according to its momentary operative position, indifferently, partially or wholly by said telescopic girder and by said frame structure. Due to this relative mobility of the crane crab along the assembly comprising the travelling crane frame and the telescopic girder, it is possible to transfer a load to and from any desired point across the ship and any selected point on land, on a quay or on another ship moored alongside, this arrangement thus constituting a considerable improvement over hitherto known structures. This arrangement further leads to the complete or partial elimination of any masts and spars as well as mast houses, winches, other cranes and the like.

According to another feature of this invention the aforesaid travelling-crane frame structure and telescopic girder comprise respectively, according to their useful length, bearing and displacement means constituting for example substantially horizontal and parallel rolling and driving tracks or runways, disposed preferably substantially at the same level, and the aforesaid crane crab comprises supporting, rolling and drive means adapted to co-operate with said rolling and driving tracks either simultaneously with said frame and said girder, or separately with one or the other of these elements, according to its momentary relative position.

According to a complementary feature of the present invention means are provided whereby the motor for driving the aforesaid crane crab is also used for controlling the displacement of said telescopic girder. This arrangement constitutes a substantial constructional simplification over known devices. By virtue of the integral transverse mobility of the crane crab throughout the width of the ship and the length of the telescopic girder, it is a logical solution to use the crane crab driving motor for controlling for instance in a temporarily fixed position the expansion and contraction movements of said telescopic girder.

This invention is also concerned with all ships, rolling vehicles, buildings, fixed ground installations or the like, whenever they are equipped with devices of the type broadly set forth hereinabove.

Other features and advantages of this invention will appear as the following description proceeds with reference to the accompanying drawings illustrating diagrammatically by way of example typical forms of embodiment of the invention. In the drawings:

FIGURE 1 is a side view showing a ship equipped with a device according to a typical form of embodiment of this invention provided with continuous overhead runways;

FIGURE 2 is a plan view from above of the same ship;

FIGURE 3 is a cross section taken upon the line III—III of FIGURE 2;

FIGURES 1a, 2a and 3a are similar views showing a modified form of embodiment provided with discontinuous overhead runways;

FIGURE 4 is a fragmentary side view showing the same ship of FIGURES 1–3 with the travelling cranes stowed in the sea-going positions on the rearmost section of the runways or tracks, adjacent the rear castle;

FIGURE 5 is a similar view concerning a modified embodiment of the arangement of FIGURE 4, wherein the rearmost section of the runways or tracks are adapted to be lowered, an elevator being provided for the travelling cranes;

FIGURE 6 is a cross section on a larger scale of an embodiment of an overhead travelling crane substantially in the vicinity of the portion wherein the telescopic girder remains anchored during its period of operation and provided with rack and gear driving means for moving either of the telescopic girder and trolley truck;

FIGURE 8 is a perspective view showing the device for supplying electric current to the travelling crane, with its current outlets and automatic cable-winding devices;

FIGURE 9 illustrates in section another embodiment of the rack and gear driving means for moving the telescopic boom and crab;

FIGURE 10 is still another form of embodiment of the driving device for moving the telescopic boom and crab wherein a roller chain is used;

FIGURE 11 is a detail view of the roller chain used in the arrangement of FIGURE 10;

FIGURE 12 is a section taken upon the line XII—XII of FIGURE 10;

FIGURE 13 is a detail view showing the locking device of the arrangement of FIGURES 10 and 12;

FIGURE 14 is a detail view showing a half-round member mounted on the telescopic girder in the arrangement of FIGURE 12;

FIGURE 15 is a plan view of the half-round member shown in FIGURE 14;

FIGURE 16 is a side elevational view of the telescopic girder of the arrangement of FIGURES 10–15 in its over-board projecting position;

FIGURES 17 to 21 illustrate the operation of the preceding device of FIGURES 10–16;

FIGURES 22 to 26 illustrate a modified construction of an overboard projecting girder;

FIGURE 30 illustrates in section the mounting of a post on the deck of a ship, the section being taken upon the line XXX—XXX of FIGURE 31;

FIGURE 31 is a section taken upon the line XXXI—XXXI of FIGURE 30;

FIGURE 32 is a section taken upon the line XXXII—XXXII of FIGURE 30;

FIGURE 33 is a section taken upon the line XXXIII—XXXIII of FIGURE 34, showing a modified structure;

FIGURE 34 is a section taken upon the line XXXIV—XXXIV of FIGURE 33;

FIGURE 35 is a plane view from beneath showing a travelling-crane runway with a post;

FIGURE 36 shows five different positions (a, b, c, d, e) of the travelling crane on its runway when being moved past an intermediate post through a rack and gear drive;

FIGURE 37 shows the mounting of the pinions of the drive shown in FIGURE 36 disposed on one side of the travelling crane;

FIGURE 38 is a longitudinal section showing the mounting of a pinion of FIGURE 37 on its shaft;

FIGURE 39 is a section taken upon the line XXXIX—XXXIX of FIGURE 38;

FIGURE 40 illustrates in plan view the general arrangement of the runway racks for moving the rolling bridge associated with an improved racks construction according to a modified embodiment;

FIGURE 41 is a section showing a pinion adapted to roll on the improved and main racks of the arrangement shown in FIGURE 40;

FIGURES 42 and 43 show the meshing engagement between said pinion and said racks of FIGURES 40 and 41; and FIGURE 44 illustrates in fragmentary section an embodiment of the travelling crane, the section being taken along a plane extending across its fixed runways to illustrate a typical form of embodiment of this invention, with intermediate pulleys.

Figure 7:
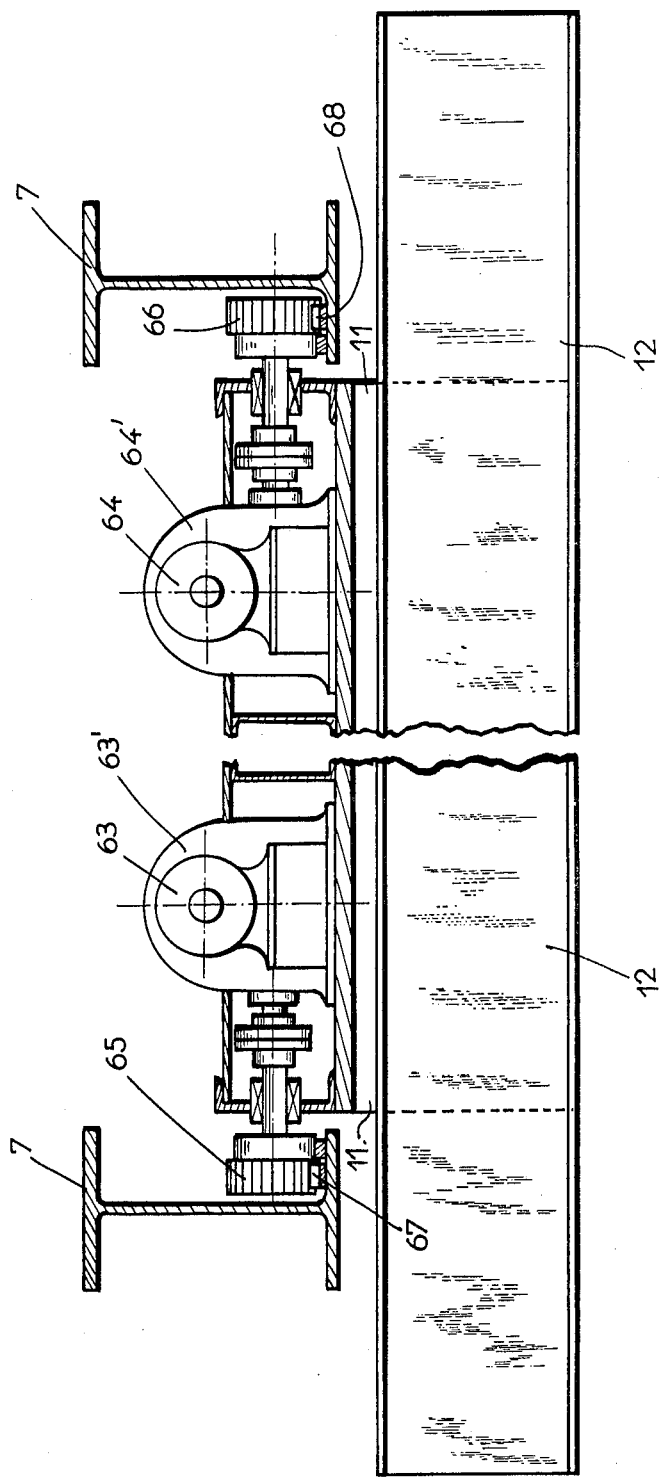
FIGURE 7 illustrates the device for driving the rolling bridge frame of the travelling crane on its runways.

In the form of embodiment illustrated in FIGURES 1 to 3 of the drawings the reference numeral 1 designates the hull of a merchantman having its stern castle 2 disposed completely at the rear near the poop-deck to free the maximum surface of the weather deck and thus facilitate the access to the holds. This ship comprises for example six holds 3 separated by transverse bulkheads 4 and to which access may be had through corresponding successive hatchways 5 adapted to be closed by hatchway panels 6. Thus, the second and fourth hatchways in the fore-and-aft direction are shown with their panels in their open position, that is, folded vertically in apple-pie fashion, and the other hatchways are shown with their panels in the closed position. The figures show a longitudinal row of hatchways but it will be readily understood that the ship may comprise several hatchways disposed side by side athwartship to constitute several parallel longitudinal rows of hatchways.

The loading and unloading apparatus according to this invention comprises an overhead runway or track consisting of two substantially parallel rails 7 extending substantially plumb with the plating on either side of the ship, and bearing on supporting members 501 consisting of posts fitted in the hull structure, preferably in the plane of the water-tight transverse bulkheads dividing the hold into a plurality of compartments, so as to constitute an integral portion of the ship's structure. Thus, four transverse pairs of intermediate posts 501 are shown, plus one pair of end posts 501 at the fore.

The straight rails 7 extends throughout the useful length of the parallel sides of the ship, from the stern or poopdeck castle 2 to the forecastle, i.e. where the ship's width decreases because its sides converge toward the stem.

On this runway, consisting of the aforesaid two rails 7, are adapted to roll one or a plurality of travelling cranes 11, extending athwartship and which, to permit the transfer of the loads to be hoisted inboard, comprise each a telescopic girder 12 and a load handling crab 13 adapted to move along the travelling-crane frame and also along its companion telescopic girder. This crane crab carries a hoisting member 14 consisting of at least one frame, rocking lever or handling bucket, or at least one hook suspended from the crab and adapted to carry the load 15. In the example illustrated in the figures the arrangement comprises five such travelling cranes, of which one is not in service and is stowed in its sea-going position at the rearmost end of the runway, that is, adjacent to the stern castle, the other four travelling cranes being shown in their operative condition above the hatchways; these travelling cranes are adapted to serve indifferently, whether separately or by groups, any one of these hatchways.

In FIGURES 1a, 2a and 3a a modified form of embodiment of the device of this invention is shown, wherein the posts 8 supporting the runways 7 are disposed by pair athwartship in alignment with the headledges of the hatchways, at the four corners of these hatchways. A sufficient longitudinal flexibility of the ship may be ensured for example by means of gaps 18 provided in the runways, these runways being braced, if desired, by means of upper cross members 17.

In FIGURE 4 there is shown the rearmost portion of the runways, which consists notably of the end section 502 supported at the front by the pair of posts 501 and bearing at the rear on the corresponding structure of the castle 2. This end section constitutes more particularly a parking or stowage track for the various travelling cranes in the sea-going condition, that is, in their inoperative position when the ship is out at sea. To this end the rearmost section 502 and the device for locking or holding the travelling cranes against motion in their assembled and stowed position have a mechanical strength sufficient to withstand the added or combined effects of the weight of these assembled travelling cranes and of the sea action. In this specific form of embodiment, the end section 502 constitutes a simple extension, solid with the runways 7, which constitute a continuous beam with several bearing posts.

In the alternate embodiment illustrated in FIGURE 5, the rearmost section 502a of the runways is displaceable vertically in either direction and the aforesaid pair of posts 501 is replaced with a frame 503 forming a kind of gantry adapted to constitute the boot of a hoist or like device 504 for the travelling cranes 11. The movable section 502a is thus supported at one end in its uppermost position by one of the uprights of this gantry 503 and adapted to slide vertically in suitable guide members of the sliding, rolling or like type provided along the castle 2 and also along the relevant upright of gantry 503. The other upright of this gantry carries the adjacent end of the fixed portion of the runways 7.

The runway section 502a is adapted to bear in its lowermost position on suitable beds or base plates and also to be locked or held in position thereon by adequate connecting means.

The operation of this storage device is described hereafter, it being assumed that the ship, after having completed its loading or unloading operations, is ready to sail:

The last section 502a consisting of the two endmost portions of runways 7 is previously freed of the travelling crane or cranes 11 likely to remain thereon, and then lowered by means of a motor-assisted or hand-actuated servo-control device until it bears on the supporting beds or base plates provided at the bottom end of its downward stroke. The travelling cranes 11 are then brought one by one on the hoist 504 of which the pair of rail sections adapted to support the travelling crane, in the uppermost position of said hoist, are substantially in alignment with fixed portion of the runways 7, that is, with the rails of the adjacent runway section. Upon completion of the downward stroke of hoist 504, the rail sections solid therewith are now in alignment respectively with the runways of section 502a locked in its lowermost position, whereby the travelling cranes 11, by virtue of its separate drive means, will roll on this section until it attains the section end closely adjacent to the castle 2. The same operations are repeated with the other travelling cranes 11 which are thus assembled side by side on the lower section 502a where they are successively stowed and firmly locked in position as they arrive thereon. After boarding a quay in a port or mooring along another ship, the preceding sequence of operations are carried out in the reverse order, so as to raise the travelling cranes in succession to restore them on the fixed portion of the runways 7, the movable section 502a thereof being freed of all its travelling cranes and resuming its operative position in alignment with the other runway section in its upper position. To afford a certain longitudinal flexibility of the ship, sliding connections may be provided if desired between the rails 7 and posts 501.

A wing or flange of the sections 7 constituting the main elements of the runways or tracks comprises a so-called roller-track zone consisting for example of the upper face of said flange or of a rail secured thereon, on which the rollers carrying the travelling-crane frame are adapted to roll. Parallel to said roller-track zone of each rail is a continuous rack adapted to be drivingly engaged by one of the drive pinions carried by the frame structure of the aforesaid travelling crane and adapted to produce the longitudinal translation of said travelling crane. This control and drive mechanism is well known per se and therefore any complementary description is not deemed necessary.

Each travelling crane 11 consists essentially of a travelling-crane chassis or structure 19 comprised of a substantially rectangular frame elongated athwartship. This frame consists of two substantially parallel and horizontal longitudinal members 20 extending also athwartship (see FIGURE 6), and interconnected by cross-members or brace members 21 disposed preferably at the upper portion of the longitudinal members 20 in order to free completely the space available between the lower portions of these longitudinal members 20. On the main beams of the frame consisting of the aforesaid longitudinal members 20 are secured several pairs of rotary rollers 23 having horizontal axes and supporting the weight of, and guiding laterally, the aforesaid telescopic girder, other rotary rollers 22 having horizontal axes being secured under the cross members 21 for guiding the girder vertically and constantly keeping this girder in contact with the carrier rollers 23. Each longitudinal member 20 comprises a substantially horizontal lower flange or wing 25 extending throughout the useful length of said longitudinal members; each flange 25 is arranged substantially like the flange of the rails 7 of the travelling-crane runway, that is it comprises on its upper face a rail or a race-forming surface 26 and that it is solid with a rack 514 adapted to drive the aforesaid crane crab 13. Intermediate stiffeners 28 are disposed at spaced intervals in order to ensure a strict parallelism betwen the longitudinal members 20. Of course, the runways 26 and racks 514 of the two flanges 25 of longitudinal beams 20 are substantially parallel.

The telescopic girder 12 consists preferably of a pair of longitudinal members 505 having a considerable relative spacing and which are interconnected at spaced intervals, if desired, at their upper portions, by means of a plate or like element 506 projecting or extending on either side externally of the longitudinal members 505 of the lateral portions 507 extending continuously throughout the useful length of the telescopic girder and carrying respectively on their lower sides or faces a pair of rail-forming beams or truss beams 508, the telescopic girder bearing through these beams or like members on rotary side rollers 23 carried by the main frame 19 of the travelling crane and disposed at spaced intervals therealong. These rotary rollers 23 comprise preferably a flange-like outer shoulder 509 for guiding the telescopic girder 12 laterally.

The two longitudinal members 505 of the telescopic girder are advantageously assembled or braced at spaced intervals by means of transverse stiffening plates, such as 510, other stiffening elements 511 bracing respectively each longitudinal member 505 with respect to the relevant beam or rail 508.

The upper rollers 22 co-act with the upper face of flange 506. The girder 12 is guided laterally by the carrier rollers 23 disposed on either side of the girder 12 for instance in the gaps provided between the successive pairs of upper rollers 22 disposed along the main chassis 19. Of course, any other suitable and equivalent lateral guide means may be substituted for these rollers 23. In FIGURE 6, there is shown the relative arrangement of these various carrier and guide rollers; they are disposed preferably symmetrically with respect to the longitudinal center line of the travelling crane.

The lower flange of the telescopic girder 12 constitutes likewise a pair of side ledges 29 disposed preferably level with the relevant flanges 25 of the longitudinal members 20 of the travelling-crane chassis. These lower ledges are disposed substantially like the flanges 25 and comprise each a rail or like runway surface 30 and a rack 515 extending throughout the useful length of the telescopic girder, parallel to the relevant elements 26 and 514 of longitudinal members 20, while registering substantially with these elements. Thus, the elements 26, 514, 30 and 515 of longitudinal members 20 and of telescopic girder 12 constitute two rolling and driving runways, that is, track means along which the handling crab 13 may be operated.

Each pair of corresponding racks 514, 515, which are rigid with the main chassis 19 and telescopic girder 12 respectively is so disposed that the generatrices of the teeth faces be substantially vertical. To this end the racks are secured preferably under the flanges 25 and 29 of longitudinal members 20 and 505 of the main chassis 19 and of the telescopic girder 12, so that the racks of each pair register substantially with each other. This arrangement is advantageous in that the fouling or dirtying of the racks, as well as the accumulation of any foreign substances thereon, are definitely avoided since these substances tend to fall by themselves.

The load handling crab 13 comprises a substantially rectangular horizontal platform 32 on which the hoisting and translation or driving mechanisms and apparatus are mounted. This platform 32 is suspended by means of uprights or like members 33, possibly with the assistance of wind-bracing or like members, from a pair of longitudinal members or like elements 35 braced if desired by cross members 519 or the like. The longitudinal members 35 or uprights 33 support respectively on the one hand the carrier rollers or wheels 512 and 513 having substantially horizontal axes, which bear respectively on the relevant runways or track faces 26 and 30 of the telescopic girder 12 and of the longitudinal members 20 of the travelling-crane chassis, and on the other hand driving pinions 516, 518 adapted to mesh with the corresponding racks 514 and 515, respectively, of the telescopic girder 12 and of the longitudinal members 20 of the travelling crane. The rollers 512, 513 through which the handling crab 13 is suspended from its uprights 33 are advantageously of the peripheral-groove type, thereby guiding simultaneously the crab laterally on its runways. The crab drive pinions have vertical axes and are mounted displaceable within the space provided between the telescopic girder and the corresponding longitudinal members 20 of the travelling-crane chassis, on either side of the telescopic girder. At least some of the rollers 512, 513 which bear on the runways of the telescopic girder and of the travelling crane are associated preferably by pairs and the rollers 512, 513 of each pair of rollers disposed on the same side of the telescopic girder are thus advantageously coaxially rigid with a common rotary driven shaft 42 having a substantially horizontal axis, which is rotatably mounted in a corresponding bearing 43 or like device secured on the longitudinal member 35 or on an upright 33 of the crane crab. The rollers 512 and 513 may for instance be mounted for loose rotation on the shaft 42. Each pair of driving pinions meshing respectively with the aforesaid racks 514 and 515 consist of a driving pinion 516 rotatably rigid with a substantially vertical rotary driving shaft 517 and also with a rotary driving pinion 518 also disposed on a vertical shaft and of a length sufficient to constantly mesh on the one hand with the rack 515 solid with the telescopic girder and on the other hand with the driving pinion 516. This driving pinion 516 is preferably mounted for sliding movement for example by means of suitable keys or splines on the driving shaft 517 in order to be capable of either meshing selectively with the rack 514 rigid with the main chassis 19 for an end or uppermost position attained during its sliding movement, or being disengaged from this rack in its opposite or lowermost position of its sliding movement, while continuing to mesh with the driven pinion 518. Each driven pinion 518 of each vertical driving shaft 517 is advantageously connected to a framework element of the crab 13 which in the case contemplated herein consists of a cross beam 519 constituting the upper frame or plate of the crab and overlying the platform 32 carrying the motor and reducing gear assembly 46 for driving the crab in translation. This upper structure may be used if desired for supporting at least one hoisting device 52 with its drum 54 for winding the hoisting cable 58 supporting in turn the hoisting hook 14.

The means for controlling the sliding movement of each driving pinion 516 aforesaid consist preferably of a rocking lever 520 or the like, pivotally mounted on the structure element 519 by means of a substantially horizontal pin 521 so that this lever 520 may rotate or oscillate in a vertical plane substantially parallel to the power shaft 517. One of the arms 522 of lever 520 is movably connected to the driving pinion 516 and to this end, if desired, it may be of forked configuration and adapted to engage with its prongs or arms an annular peripheral groove formed in the hub 523 of pinion 516.

All the rocker levers 520 may be controlled in synchronism from either a hand control device or servomotor means of the hydraulic, electrical, pneumatic or other type.

In conformity with the above remarks expressed in connection with FIGURE 6, the rollers 512, 513 and pinions 516, 518 are disposed on either side of the telescopic girder. In FIGURE 6, there are thus shown two pairs of pinions 516, 518 having their axes disposed substantially in a common vertical plane and two pairs of rollers 512, 513 rigid with a common shaft 42, respectively. Of course, the number of supporting or carrier rollers, driving pinions and guide rollers given hereinabove should not be construed as limiting this invention since it can vary according to specific requirements and practical applications. However, this number may advantageously be considered as constituting a minimum necessary for ensuring a sufficient stability of the crab.

The platform 32 of the handling crab 13 carries the following apparatus (see FIGURE 6):

A driving and reducing unit for producing the high-speed translation of the crab, which consists of at least one high-speed reversible electromotor and a reducing gear 46 having a bilateral output shaft 524 driving through a pair of adequate bevel gears 525 or the like the aforesaid pair of vertical shafts 517 respectively, which are disposed on either side of the crab.

At least one hoisting winch or like device 52 located for example near a longitudinal end of platform 32 and comprising a drum for winding the feed cable 54.

These various apparatus are advantageously disposed substantially along the longitudinal center line of the aforesaid platform 32.

The movements of translation of the travelling-crane chassis 11 are obtained preferably by means of at least two reversible electromotors 63, 64 coupled mechanically or electrically with each other and driving respectively through suitable reducing gears 63', 64' carrier rollers bearing on the runways 7, or corresponding driving pinions meshing with the relevant racks 67, 68 associated with the rails 7 of the travelling-crane runways (FIGURE 7). However, it is more advantageous to provide an electrical connection between the motor rotors, due to the substantial distance separating these motors, which corresponds to the relative spacing of the runways 7.

All of the electromotors of the travelling crane are fed with current (see FIGURE 8) through:

First—A cable winder or like device 69 located on the travelling-crane chassis 11 and receiving electric current from various outlets 70 disposed at spaced intervals along the runway 7.

Second—Another cable winder 71 delivering electric current from the travelling crane 11 to the handling crab 13.

Safety limit-switches are provided for stopping the motors in due time to avoid any faulty operation.

The various electrical controls are advantageously assembled in a control cab 529 carried by the handling crab 13 and equipped with a suitable control board or station.

Means are provided for holding the aforesaid handling crab 13 against motion relative to the chassis of the travelling crane 11 (see FIGURE 6). The arm 526 of each rocker lever 520 which is opposite to the driving pinion 516 is advantageously connected to a sliding or like locking pin 527 carried by the crab 13 for example and adapted to engage a corresponding orifice 528 formed in the main chassis 19 of the travelling crane for invariably locking said handling crab 13 with said main chassis 19. This mounting is so designed that the lock pin 527 engages the orifice 528 when the driving pinion 516 is in its lowermost position, that is, disengaged from the rack 514 of the main chassis 19.

Means are also provided for locking the aforesaid telescopic girder 12 in relation to the chassis of the travelling crane 11 in each end position thereof, that is, the outermost outboard overhanging positions. These locking means consist preferably of at least one sliding or like lock-bolt or peg 74, disposed for example substantially vertically, mounted on the travelling-crane chassis 19 and adapted to engage a corresponding orifice or recess 75 formed in the telescopic girder 12 (FIGURE 6).

Preferably, to reduce any loss of height under the hoisting hook 14, the latter should preferably be capable of being raised as much as possible under the platform 32 of crab 13.

The operation of the device is particularly simple and efficient. During the inoperative periods and more particularly when the ship is out at sea, the travelling crane or cranes 11 are brought to their stowage position at the rear end of the runway 7, along the front face of the castle 2, where they are firmly trimmed on the runway in sea-going condition, the telescopic girder 12 being of course retracted inside the chassis 19 of the travelling crane.

To operate the device each travelling crane 11 is brought above the hatchway concerned by starting in the proper direction its two driving electromotors coupled electrically or mechanically. The telescopic girder 12 is then moved to its overhanging position on the proper side by operating the motor controlling the movement of translation of the handling crab 13. To this end, the carriage 13 is moved through its translation motor substantially up to the middle of the frame of the rolling bridge 11 and locked in position by the aforesaid locking pins. To this end the rocker levers 520 are controlled preferably simultaneously in order to lower the driving pinions 516 and cause same to be disengaged from their relevant racks 514 of the main chassis, while pushing or raising the lock bolts or pegs 527 in order to cause same to engage their corresponding orifices 528 of the main chassis, whereby the handling crab 13 is locked or held against motion while connecting same invariably to the main chassis 19. The telescopic girder 12 is then unlocked by removing the lock bolt 74, whereby this telescopic girder may not be driven in relative translation by means of the driving and reducing unit 46 through the power shafts 517 operating the driving pinions 516 driving in turn the driven pinion 518 meshing with the respective racks 515 rigid with said telescopic girder 12. When the telescopic girder has completed its outward stroke it is locked again by means of the bolt or peg 74 of the main chassis 19 of the travelling crane, and the rocker levers 520 are then operated in the opposite direction, thus restoring the driving pinions 520 (due to their sliding-key couplings) to their upper position in which they mesh with the relevant racks 514 rigid with the main chassis 19, whilst the lock bolts or pegs 527 are simultaneously lowered to free the handling crab 13. Under these conditions the handling crab 13, due to the simultaneous meshing of each pair of pinions 516, 518 with their corresponding racks, can move indifferently along the telescopic girder 12 in its outermost overhanging position and on the main chassis 19 of the travelling crane without any interruption, from the end of the chassis 19 which is opposite to the outboard end of the telescopic girder to the free projecting end of the overhanging telescopic girder 12, and vice versa. In order to ensure a proper alignment between the racks of the telescopic girder 12 and travelling-crane chassis 19 in the operative position, the telescopic girder 12 must necessarily be moved by a length constituting a multiple of the common pitch of the teeth of these racks. The length of this displacement is obtained when the travelling-crane lock bolt or peg 74 can penetrate into its orifice or recess 75 formed in the telescopic girder 12. During this operation, the transverse crab is operated preferably at low speed.

To stow the travelling-crane assembly, the above-described operations are accomplished but in the reverse order.

Of course, if desired the hoisted load may be transported in the longitudinal direction of the ship when the telescopic girder is retracted, and in this case the assembly is operated and behaves like an ordinary travelling crane.

Improvements brought to the above-described device will now be depicted together with a number of particularly interesting forms of embodiment.

In FIGURE 9 of the accompanying drawings there is shown an alternate embodiment wherein the two pinions rolling on the racks carried by the telescopic girder and on the travelling crane are constantly in meshing engagement with these racks. The following description refers to an arrangement suitable for only two pinions, but is will readily appear to anybody conversant with the art that it would not constitute a departure from the present invention to double this arrangement as in the preceding example, that is, by providing the same arrangement on either side of the crane crab.

The frame structure of the travelling crane is designated diagrammatically by the reference numeral 102 in this alternate embodiment. The frame structure of the telescopic girder or like device is shown at 101 and the crab is designated at 103. On this crab a driving pinion 144 is provided which operates another pinion 145 keyed on a power shaft 146. To this end an axial key 147 is used whereby this power shaft can slide axially to a certain extent. This shaft carries another pinion 148 also keyed thereon by means of a key for example of same type as the one keying the pinion 145. This other pinion 148 is in meshing engagement with the rack 149 provided on the telescopic girder 101. A loosely rotating pinion 150 is provided which meshes with another rack 151 carried by the travelling crane 102. This pinion 150 is solid with a thrust bearing 152 provided preferably with sealing or packing means shown diagrammatically at 153. A disc clutch such as 154 is secured on the shaft 146 whereby the pinion 150 may rotatably be connected with or disconnected from the shaft 146.

One end of the power shaft 146 is housed in a fixed case 156 containing for example a sliding member 157 rigid with said shaft 146 through a cross pin 158 and urged by a coil compression spring 159 or like member.

In axial alignment with the opposite end 160 of shaft 146 is another case 161 properly located and secured on the frame structure of the travelling crane 102. In this case 161 an orifice 162 having a diameter equal or slightly greater than that of shaft 146 is formed. An electromagnet 163 is housed within said case and controlled through an electrical circuit 164.

The operation of this device is extremely simple. The two pinions 148 and 150 are constantly in meshing engagement with the racks 165 and 151 along their common range. These pinions 148, 150 drive by turn since pinion 148 is keyed on its shaft and pinion 150 adapted to be driven through the disc clutch 154. Under these conditions, when the shaft 146 is moved to the right as seen in the figure, the loose pinion 150 is disconnected from the drive. Thus, when the crab has completed its movement toward one end of the travelling crane 102, with the shaft 146 registering with the orifice 162 formed in the case 161, simply energizing the electromagnet 163 will draw this shaft through the orifice 162 and lock the crab in relation to the crane structure. If the power shaft 146 is kept turning the pinion 148 will cause the telescopic girder to move in relation to the crab and to the crane structure.

In FIGURES 10 to 21 of the attached drawings there is shown a modified form of embodiment of the device of this invention. In FIGURE 10 the travelling crane structure 102 is shown as comprising a telescopic girder 101 and the latter is guided within the crane chassis by means of rollers such as 185 and 186 (see FIGURES 10 and 12), side rails 187 belonging to the telescopic girder extending between these rollers.

The crab 103 is provided with a number of rollers permitting its movement along the guide tracks provided on the girder and also on the travelling crane. In FIGURE 10 two pairs of carrier rollers 188 and 189 are shown, rollers 188 engaging the runways 190 provided on the travelling crane whilst rollers 189 engage a runway 191 provided on the telescopic girder. The movement is transmitted through a shaft 192 actuating a pinion 193 in meshing engagement with another pinion 194 having mounted on its shaft a sprocket wheel 195 receiving a roller chain or any other suitable flexible drive member adapted to co-act with a pinion to constitute a mechanical transmission. This roller-chain wheel 195 is drivingly engaged by a roller chain 196 shown more in detail in FIGURES 11 and 12. This chain comprises rollers 197 interconnected through plates 198 (FIGURE 12) and the chain links consist of angle members 199, as shown.

This roller chain 196 is passed over the telescopic girder as shown in FIGURES 10 and 12. To this end, one or more guide members 200 and other elements 201 for example of U-shaped configuration are provided around this girder.

As shown more particularly in FIGURES 17 to 21, the chain 196 comprises a lower reach housed in guide elements 200 provided on the lower portion of the telescopic girder.

In the common portion of the telescopic girder and travelling crane assembly, that is, between the two half-round members 204–205, the chain is rigidly assembled with the travelling crane by means of fixed supports 200′ (FIGURE 10). It will be seen that the lower reach of this chain behaves like a rack secured on the crane and that the guide members 200 secured on the telescopic girder can slide on the chain during the displacement of said girder.

The two ends of the chain are secured on the travelling crane by means of winding devices provided with elastic return means 202, 203.

The two ends of the telescopic girder are provided with half-round or curved members 204, 205 having on their outer periphery guide means (see FIGURES 14 to 16) 206 permitting the passage of the chain 196. These elements may be rendered solid with the telescopic girder by means of studs or bolts 207, and their arrangement is such that it can be pushed by the girder outside the travelling crane. Stop members 208 are provided to prevent said half-round or curved elements 204, 205 from penetrating beyond a predetermined limit into the rolling bridge or travelling crane, i.e., from following the movement of the telescopic girder inside the travelling crane. In FIGURE 16 the telescopic girder is so positioned that it projects from the travelling crane, the reference numeral 102 showing diagrammatically the outer limit or contour of this crane.

Locking means are provided to permit the anchoring of the crab on the telescopic girder or boom. In other words, these locking means serve the purpose of holding the crab against motion with respect to the telescopic girder or boom and to enable the telescopic girder to be moved to its outboard position by means of the same motor as that ensuring the crab displacements. FIGURES 12 and 13 illustrate a typical embodiment of this locking device. In this example an electromagnet 209 provided with a T-shaped armature 210 is used. A pair of angle members 211, 212 are provided on the telescopic boom and the cross bar of said T-shaped armature is adapted to be engaged behind these angle members, as shown.

The device described hereinabove operates as follows:

As shown in FIGURE 17, the telescopic girder is contained completely within the telescopic boom. When it is desired to move the girder to its left-hand outboard position as seen in the figure, the chain sprocket 195 is firstly rotatably driven to move the crab to the right (as seen in this figure). Upon completion of this stroke (FIGURE 18) the crab is locked on the telescopic boom by the action of the aforesaid device 209, 210. To this end, the electromagnet is energized and its armature 210 is pulled out, and a slight movement of the crab will cause the head of this armature to engage one of the two angle members 211, 212 provided on the telescopic boom.

As the chain sprocket 195 is kept rotating the telescopic girder begins to move leftwards (FIGURE 19) and drives in front of it the half-round element 204. The rear half-round element 205 remains locked in position by the stop 208, as shown in said figure. The chain is unrolled in front of the leading half-round element 204, due to the provision of a corresponding tensioning device 202. Upon completion of its stroke, or at least after a stroke of a predetermined length, the telescopic girder is locked in position through any known and suitable means, and the crab is unlocked so that it can be operated in the desired conditions.

The return movement of the telescopic girder is obtained under the same conditions. Firstly, the crab is moved to the right (FIGURE 34), whereafter the crab is locked in relation to the travelling crane. By continuing the rotation of the chain sprocket 195, the telescopic girder is caused to recede until the position shown in FIGURE 17 is attained.

Of course, the same sequence of operations are carried out when it is desired to move the girder to its opposite overboard position.

Another form of embodiment likely to be of interest when it is desired to have elements projecting on port and starboard sides by a length greater than, or equal to, half the length of the travelling crane proper, and to have on the crab a constant distance between the sprocket centers, is proposed herein with reference to FIGURES 22 to 26 of the drawings.

FIGURE 22 shows the end portion of the travelling crane 102 on which a projection 165 carrying a pivot pin 166 is provided. Pivotally mounted on this pivot pin 166 is a girder 167 on which the transverse crab 103 is shown in very diagrammatic form. The runway provided on the ship for supporting the travelling crane is shown also very diagrammatically at 168.

The pivoting girder 167 is adapted to be set in two positions of which one (the operative position) is shown in thick lines and the other (the inoperative or folded position) is shown in chain-dotted lines. At its lower portion the pivoting girder comprises a flange or like element 169 acting as a stop member. In other words, when the girder is in its operative position the flange 169 bears against the end of the travelling girder, as shown in FIGURE 22.

In FIGURES 23 and 24 an arrangement is illustrated wherein two pivoting girders 167, 167' each of a length smaller than half the length of the travelling crane are each mounted at one end of the crane 102. In this case the two elements 167, 167' may be folded to assume the positions shown in FIGURE 24.

When the length of the two pivoting elements 167, 167' are greater than half the length of the travelling crane, some means must be provided to permit the crossing of their end portions in their folded position. To this end a slight inclination is imparted to the pivot pins 166, as shown in FIGURES 25 and 26, in relation to the ship's axis or the axis of the runway of the travelling crane. Likewise, the end portions of the two girders are free of bracing members on the length necessary for the crossing.

It goes without saying that the pivot pins 166 may be of the hydraulic hinge or like type.

To permit the loading of special cases of goods of a weight exceeding the rated capacity of the travelling crane, so that the use of port cranes or like handling and hoisting machines is necessary, it may be desirable to retract completely the runways, and to this end the arrangement shown in FIGURES 27, 28, 29 and 29a may be resorted to.

Figure 27:
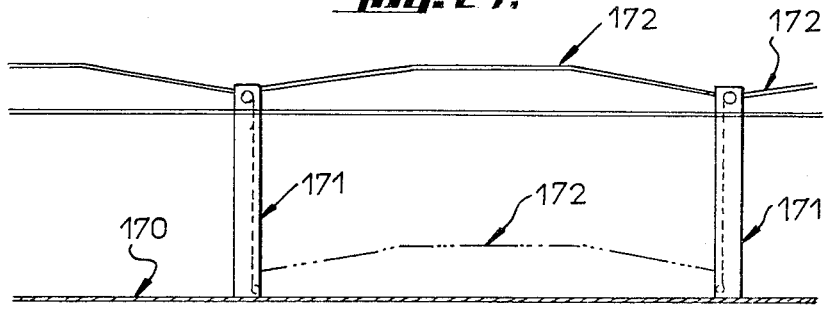
FIGURES 27 to 29 illustrate fragmentary views of one side of a ship equipped with a modified form of embodiment of the device, showing on the one hand the runway of the travelling cranes which has been lowered on the deck and on the other hand a supporting post folded back onto the runway in the sea-going position.
Figure 28:
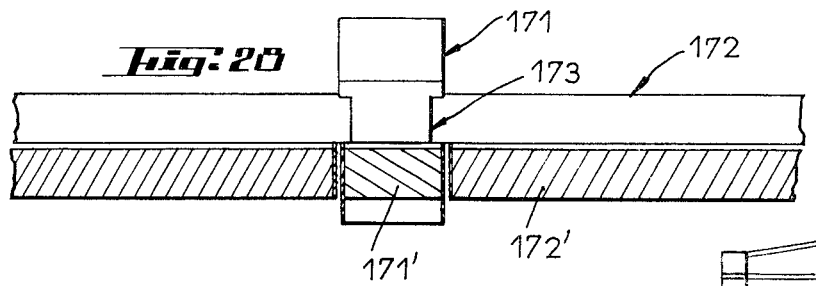

As shown notably in FIGURE 27, the ship's deck 170 carries posts 171 supporting in turn the runway-forming beam 172. To meet the above-mentioned requirements, it is sufficient to provide means for allowing the beam element disposed between two adjacent posts to slide therealong. Under these conditions, the end portion of this beam is simply designed as shown in FIGURE 28. A slideway 173 is then provided in the posts 171 receiving the relevant ends of the runway-forming beam. Of course, the upper end of the posts will constitute the extension of the runway (as shown at 171' and 172') for interlinking two adjacent aligned beams.

The beam operation may be effected by using any suitable means, such as hand-operated hoists suspended from the top of said posts, etc. Of course, in the raised position the beams are locked by pegs or pivoting bolts holding them against downward movement, but without clamping them in the longitudinal direction in order not to interfere with the flexion of the ship or with the thermal expansion effects.

Figure 29:
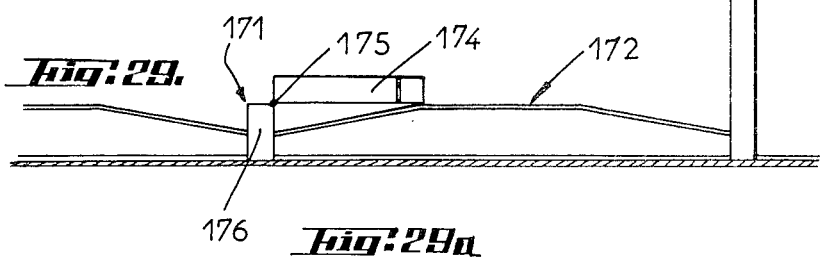
Figure 29A:
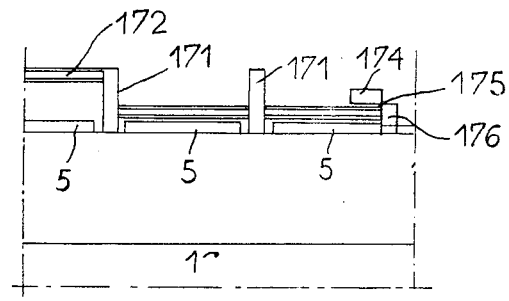
FIGURE 29a is a view similar to FIGURE 27 but concerning the fore section of the runways with the endmost post in its folded position.

In some cases it may also be useful to provide folding posts as shown in FIGURES 29 and 29a. In this example the posts 171 comprise each an element 174 pivoted at 175 on the base element 176. The height of this base element is substantially equal to that of the runway-forming beam 172. FIGURE 29a illustrates two end sections of the runway toward the fore end or forecastle of the ship.

In the foregoing it was stated that the posts supporting the runways could be secured on the ship's planking and located preferably in the plane of the transverse bulkheads of the ship's hull. In the following part of the description various details and a few complementary developments of this mounting will be described with reference to FIGURES 30 to 34 of the drawings.

Preferably, the posts 171 consist of a sheet-metal frame-like structure having a rectangular cross-section, as shown in FIGURES 30 and 31. The sheet-metal elements constituting the structure may be welded directly on the ship's deck 170. In this case, carlines 177 secured on the deck in the plane of the sheet-metal elements 178 constituting the post casing may be provided.

As a rule and as already stated hereinabove, each post lies preferably vertically above the water-tight bulkhead 180 provided between adjacent holds. Across the post carlines, uprights reinforced by gussets 179 lying inside the hold and connected to the corresponding water-tight bulkhead are provided. The outer face of the post may also constitute an extension of the side sheet element 181 of the ship (see FIGURE 33).

If desired, the post faces 182 may be caused to extend through the ship's deck by providing extensions of said faces beneath the deck for example down to or beyond the next deck (FIGURES 33 and 34).

In any case, the deck may be cut inside the posts to permit the access to the holds. The corresponding apertures 183 may also be used for ventilating purposes, for passing pipe lines, electric lines, or for stowing goods or loose materials 'tweendeck, etc.

These apertures are shown at 183 in the various figures. Likewise, doors 184 may be provided in the walls of said posts.

In the specific form of embodiment illustrated in FIGURES 35 and 36, it is assumed that the runway consists of two beams 301, 302 secured on a post 303.

These runways are provided with racks 304, 305.

Preferably, to avoid the dirtying or sooting up of the racks and the consequent frequent cleaning thereof, the arrangement already described hereinabove is adhered to by so disposing the rack 304, 305 that their teeth extend downwardly. To this end, these racks are mounted on the underface of the runway beam flange.

In the preceding case, it was assumed that the upper face of post 303 had to be placed nearly level with the runway. It was also contemplated to mount on this face a rack so that the other faces leading thereto and formed on the two beams 301 and 302 secured on this post may be interconnected.

According to the improved form of embodiment now contemplated this procedure is no more adhered to and the racks are discontinued where the posts are provided. Of course, this gap formed in the racks may also be provided for other reasons and at other locations. Pinions resiliently mounted on their shafts may be used to this end.

The general arrangement of these pinions is illustrated more particularly by way of example in FIGURES 36 and 37, wherein only one side of the travelling crane is illustrated since the opposite side comprises a symmetrical disposal.

On the left-hand side of the travelling crane two pinions 306, 307 mounted on shafts 308, 309 respectively are provided.

The longitudinal spacing of these pinions is at least equal to the length of the gap contemplated for the racks.

These pinions are mounted on their shafts with the interpositions of a resilient connection as shown and described in a preceding form of embodiment, or as shown in FIGURES 38 and 39. In fact and as will be explained presently, it is necessary that one of the pinions may accomplish a certain rotation in relation to the other to enable the two pinions to roll on racks somewhat shifted to each other, for example by a distance of from half a tooth pitch to one and a half tooth pitch.

In FIGURES 38 and 39 there is shown a pinion 306 mounted on its shaft 308. On this shaft 308 there are also provided a pair of projecting members or keys 310, 311 fitting in circular grooves 312, 313 formed on the inner surface of the hub of pinion 306. As a result, the pinion is adapted to perform a certain movement of rotation about its axis.

The drive takes place when the keys 310 and/or 311 abut against the end edges of grooves 312, 313.

Mounted on the hub of said pinion is a resiliently deformable member 314 such as a coil spring or the like, having one end 314' attached to a member solid with the shaft, and its other end 314" solid with another member 316 mounted in the pinion 306. The pinion is mounted on the corresponding shaft for example by means of a locked nut 316.

It will be seen that with this particular assembly the pinion is constantly urged to an intermediate position illustrated in FIGURE 39. Under the influence of certain controlled stress, limited angular movements may be accomplished on either side of this intermediate position.

In FIGURE 37 there is shown the mounting of pinions 306, 307 on one side of the travelling crane as well as their operative connection with the driving motor.

On the ends of shafts 308, 309 which are opposite to those carrying the pinions 306, 307, bevel pinions 317, 318 are mounted; these bevel pinions are in meshing engagement with other bevel pinions 319, 320 mounted in turn on the half-shafts 321, 322. These half-shafts are driven from a motor 323, if desired through a reducing gearing 324.

Of course, the motor 323 may either drive both sides of the travelling crane or be coupled with another motor disposed on the opposite side.

The operation of the device described hereinabove is particularly simple.

Referring to FIGURE 36a, it will be seen that the rack 304 terminates at the post 303 and that it is continued on the other side of this post by the rack 305. The travelling crane is shown diagrammatically in the form of an assembly 323, 306, 307 rolling on said racks. Assuming that the direction of movement is that shown by the arrow F, it will be seen that in the position depicted in FIGURE 36a the pinion 307 has completed its permissible stroke on the rack 304.

It is immaterial whether the relative position of the two pinions has not been determined exactly as a function of the dimensions of the rack teeth, due to the specific resilient mounting described hereinabove. In fact, the front pinion 307 is in abutment, that is, rigidly connected with its shaft, and acts therefore as the driving pinion.

As the movement continues in the same direction, it will be seen that when the crane moves to the position shown in FIGURE 36b the pinion 307 is disconnected from the rack 304 and revolves loosely. Here a very short pause may take place, during which the shaft 308 revolves in relation to the pinion 306 until it is stopped. Then the pinion 306 becomes automatically the driving pinion.

After clearing the gap occupied by the post 303, the pinion 307 meshes with the rack 305, its resilient mounting permitting the proper relative engagement of the teeth. This position of the travelling crane is illustrated in FIGURE 36c.

As the movement continues, pinion 306 leaves rack 304 and the other pinion 307 becomes the driving pinion, as shown in FIGURE 36d.

When the travelling crane has cleared completely a length corresponding to the width of post 303, pinion 306 meshes with rack 305 and the travelling crane movement is continued with the pinion 307 acting as the driving pinion. This position is shown in FIGURE 36e.

As a rule, the movement of the pinions as they engage the racks is not attended by appreciable difficulties. It is a seldom occurrence that the pinions contact with the tip of their teeth the tip of the rack teeth, although this condition may arise in practice. It is a complementary feature of this invention to avoid this inconvenience by means of an arrangement desecribed hereinafter in detail.

Whe a pinion tool engages the tip of one tooth of the relevant rack, a reaction is exerted in the radial direction. Now the resilient mounting of the pinion is effective only in case of tangential stress. As a result the radial stress or reaction produced in this case are not capable of causing the pinion to pivot about its axis, and a jamming of the assembly is likely to occur.

This detrimental condition is avoided by associating with the pinion, according to a characteristic feature of this invention, a device adapted to create a tangential reaction becoming effective when there is a risk of jamming, this device causing the pinion compulsorily to assume the proper position to produce the proper meshing engagement with the rack.

A typical form of embodiment of this arrangement is shown in FIGURES 40 to 43 of the accompanying drawings.

The basic idea of this arrangement consists in providing the driving pinion 307 with an auxiliary device consisting for instance of another pinion meshing with a different rack having a special configuration, so designed that the initial portion of the meshing engagement takes place as a consequence of the action produced between the side faces of the teeth of said auxiliary rack, and that under no circumstance a direct contact from tip to tip between registering teeth of said auxiliary pinion and said auxiliary rack can take place.

According to a specific form of embodiment, auxiliary racks 326, 327 slightly shifted as shown in FIGURE 40 are provided before and after each main rack 325. These auxiliary racks carry at the front, that is, at the end where they engage the pinion, teeth having the shape illustrated more particularly in FIGURES 42 and 43. It will be seen that the first tooth 328 is very short and that the following teeth 329, 330 are very sharp. The remaining teeth 331, 332, etc., for example, are curved and have a rather conventional contour.

The arrangement of this auxiliary rack in relation to the main rack 325 is such that a synchronism is obtained between its teeth and those of the said main rack. In other words, when a pinion meshes with one tooth of said auxiliary rack, one is definitely certain that after moving through the predetermined distance the pinion 307 will automatically and properly engage with its teeth the teeth of the main rack, without the slightest clash or knock, just as there were only one and a single rack.

On the outer surface of pinion 307, as shown in FIGURE 41, a special pinion 333 is provided, this special pinion 333 being rigid with the main pinion 307 and provided with sharp teeth as shown in FIGURES 42 and 43.

This very simple arrangement operates as follows:

When, as shown in FIGURE 42, the auxiliary or special pinion 333 (the one provided with sharp teeth) is in phase with the auxiliary rack 326, the teeth of the main driving pinion shown in broken lines at 307 will also be in phase whereby the sharp-toothed pinion 333 will roll easily on the auxiliary rack until the teeth of the main driving pinion are in proper meshing engagement with those of the main rack.

When the pinion or more exactly the assembly formed by the two pinions 307 and 333 arrives with a certain relative shift of up to half a tooth, as shown in FIGURE 43, it will be seen that the sharp-toothed pinion 333 will take a first position a when contacting the first tooth 328 of the auxiliary rack 326. Since, due to the special contour of these teeth, no contact can occur between the tips of the teeth, it is evident that the teeth will contact one another with their side faces, whereby the pinion 333 will be compelled by its auxiliary rack 326 to assume the successive positions b, c, shown in thick lines, in broken lines and in chain-dotted lines in FIGURE 43. Since a shift exists, the rolling movement of the special pinion 333 will cause the main pinion 307 solid therewith to revolve about its axis. As a result, the driving pinion 307 will engage the main rack in a suitable relative position, as shown in FIGURE 43.

During the return stroke of the travelling crane the movement takes place in the opposite direction. When the pinion 307 leaves the rack it is in phase therewith like the auxiliary pinion 333. The special rack 326 does not produce any specific function. On the other hand, in this case it is the rack located in front of the leading end of the next driving rack that becomes operative when the pinion has to be rotated or adapted to the pitch of the new rack.

It will be seen that with this procedure it is possible without any inconvenience to break the continuity of the racks at the proper or desired locations without producing any interference whatsoever in the travelling crane operation. Of course, the very short stops occuring in the operation of the travelling crane as a consequence of the very small angular movements effected by the pinions about their axes are immaterial.

In the form of embodiment shown by way of example in FIGURE 44 the fixed longitudinal overhead runways for the travelling crane are designated by the reference numeral 401 and support athwartship the main frame structure 402 of the travelling crane proper, this structure carrying for example on an upper platform 403 the apparatus 404a and 404b controlling the longitudinal movements of the travelling crane as well as the hoisting apparatus 405. Mounted in the travelling crane 402 is the telescopic girder 406 carrying in turn the crane crab 407 displaceable athwartship along the telescopic girder and the travelling crane. The hoisting apparatus comprises at least one motor-driven winch incorporating at least one winding drum 408 for a hoisting cable 409 having suspended from its free end a hoist hook or other equivalent gripping member 410. The motor shaft is substantially parallel to the direction of motion of the travelling crane.

Thus, the handling crab carries only the translation apparatus 411 intended for producing its relative motion and since the hoisting winch is now mounted on the main frame of the travelling crane the handling crane constitutes but a kind of movable guide means for the hoist cable or cables.

To this end, the handling crab comprises at least one pair of loose pulleys 412a, 412b for guiding the hoist cable, the axis of rotation of these pulleys being substantially horizontal and parallel to that of the winch drum 408; these pulleys are so disposed that their grooves register substantially with each other and are coplanar. The hoist cable 409 from the winding drum is adapted to pass between these pulleys and over at least one of them, so that it is advantageous that the axes of these pulleys lie in a common horizontal plane and that the two pulleys be sufficiently close to each other to permit a safe and reliable passage without any risk of accidental jumping of the hoist cable from one pulley to the other and vice versa during the movement of translation of the crab.

In the form of embodiment illustrated the main frame 402 comprises at least one pair of intermediate loose pulleys 413a, 413b having substantially horizontal axes parallel to the drum axis, these pulleys being disposed preferably side by side, in the same manner as the guide pulleys, that is, with their grooves disposed respectively in a common plane, the two pulleys being if desired sufficiently close to each other to permit the maintaining or retaining, as well as the safe transfer of the cable from one pulley to the other, during the movements of translation of the crab.

The relative position of these two return pulleys will advantageously be such that the reach 409a of the hoist cable connecting the drum to one or the other pulley 413 extends substantially vertically or at right angles to the direction of travel of the crab, or at least in the common vertical plane externally tangent to the drum 408 and pulleys 413, and that the other reach 409b of the hoist cable which extends between said return pulleys and either of the guide pulleys 412 on the crab be substantially horizontal or at least parallel to the direction of travel of the crab, whereby the hoist cable is diverted substantially at right angles. The advantage resulting from this specific arrangement will readily occur to anybody conversant with the art, since the speed at which the relative rectilinear movement of the handling crab is then substantially equal to the linear speed at which the length of the free portion of the cable 409c depending under the guide pulleys 412 would vary if the drum 408 did not rotate during the crab movement, whereby a simple means would be obtained for regulating the drum motion with a view to keep this length to a constant value, for example for keeping the cable motionless in relation to the crab throughout the crab travel.

To this end, means are provided for regulating the rotary motion of the winding drum 408 with a view to cause the selective and preferably automatic control of said rotational movement to be responsive to the rectilinear travel of the aforesaid crab, so that a predetermined relationship between the mutual relative speeds of said crab and said cable are established and maintained. Thus, for example, the regulating system may be designed with a view to control the drum rotation, so that the cable 409 will remain stationary in relation to the crab during the latter's movement, this amounting on the one hand to compensating the variation in length of the cable section 409c hanging freely from the guide pulleys 412 of the crab during said relative movement of the crab and, on the other hand, to reversing the direction of rotation of said drum when the direction of said variation in length is reversed, in order to keep to a substantially constant value the height available under the suspension or hoist hook.

FIGURE 44 illustrates in thick lines the relative position of the crab 407 toward the left-hand side with respect to the winding drum 408, and in chain-dotted lines the relative position of the same crab when it is on the right-hand side with respect to the winding drum.

In the frequent case where the winding drum 408 comprises circular peripheral grooves forming a substantially continuous helical groove for winding the cable 409 to form a single layer of juxtaposed turns, the length of the cable portion 409a between the drum and the return pulleys 413 or, which is the same, the relative spacing between the horizontal plane passing through the axis of drum 408 and the horizontal axial plane of pulleys 413 should be sufficient to avoid any unduly pronounced maximum inclination of said cable to the vertical common plane of the grooves of pulleys 413, so that the cable will be properly wound and unwound.

The operation of this device is very simple. When the crab is stationary with respect to the telescopic girder 406 and to the travelling crane frame 402, the load suspended from the hoist hook 410 is lifted or lowered by the operator who actuates the member controlling the rotation and the reversing of the drum alone. When the crab is in relative motion on the travelling crane and the telescopic girder, it is necessary on the one hand that the winding drum be rotatably driven and on the other hand that this movement of rotation be responsive to the crab movements, in order to keep to a constant value the height available under the hook by constantly reducing to zero the relative speed of cable 409 with respect to the moving crab; in fact, if the winding drum 408 remained stationary during the crab movement, the length of the free hanging portion 409c of the hoist cable, of which the driving speed in relation to the travelling crane would then be zero, would increase or decrease according as the handling crab moves towards or away from the vertical of the winding drum, the direction of this length variation being reversed when the free hanging portion 409c is in vertical alignment with the vertical portion 409a of the cable which connects the return pulleys 413 to the drum 408, that is, as a rule, when the length of the cable portion (409a+409b) connecting the drum 408 to one of the guide pulleys 412 on the crab attains a minimum value.

This servo-action introduced into the drum rotation when the crab is being operated may be obtained manually under the control of the operator who alters directly the magnitude and the direction of the velocity of rotation of said drum, so that the height available under the hoist hook remains unchanged, or is a function of a predetermined law of variation of the height available under the hoist hook.

The aforesaid servo-action may also be obtained automatically by using a suitable regulating device already known per se, of which the design may be simplified due to the linear relationship likely to exist between the velocity of translation of the crab and the linear speed of the hoist cable as a consequence of the direction given to the cable section 409b lying between the guide pulleys 412 on the crab and the return pulleys 413 on the main frame, in the direction of motion of the crab. This linear relationship or proportionality is reduced in this case to an equality in absolute value of the relative speeds of the crab and cable.

Although the present invention has been described in conjunction with preferred embodiments, it is to be understood that modifications and variations may be resorted to without departing from the scope of the invention, as those skilled in the art will readily understand. Such modifications and variations are considered to be within the purview and scope of the invention and appended claims.

What I claim is:

1. In combination with a ship having a hull and a weather deck provided with at least one longitudinal row of spaced hatches, a power-driven overhead travelling crane mounted on said deck for travel lengthwise of said ship comprising two substantially parallel rows of an equal number of spaced posts provided along and rising from said deck and arranged in longitudinally aligned relationship close to either side planking of said hull, respectively, said posts being integral with the hull structure and each post of one row registering athwartships with a corresponding opposite post of the other row; a pair of substantially parallel, horizontal elevated runways secured to the top of the posts of said two rows, respectively, and extending the full useful length of said deck; at least one rolling bridge extending athwartships substantially the width of said deck to span the distance between said runways and movable thereon longitudinally of said latter, said bridge having the general shape of an open-ended inverted channel formed with substantially parallel vertical fore and aft-sides having their lower edge provided each one with a substantially horizontal inward turned flange confronting in parallel relationship and on a level with each other and extending the full length of said bridge, said fore and aft sides carrying on their inner faces spaced roller means horizontally aligned along the length thereof; a telescoping boom of substantially the same length as said bridge, accommodated within the latter between said fore and aft sides thereof and slidably supported sidewise on and guided by said roller means, whereby said boom is reciprocally shiftable endwise from a retracted position inside of said bridge to an overboard extended position wherein it projects outwards at least in part from either end of said bridge, said boom being formed at its bottom part with a pair of substantially parallel, horizontal outward turned flanges on a level with each other, extending the full length of said boom and registering in spaced relationship with said inward turned flanges, respectively, said flanges having each one an upper face forming a roller-track; a rolling crab provided with at least two pairs of wheels for riding on said pair of bridge flanges and on said pair of boom flanges, respectively, whereby said crab is suspended from said crane and movable in a continuous manner along the full length of both of said bridge and said boom from the free extreme overboard projecting end of said boom in its outward extended position to the opposite remote extreme end of said bridge, thus being indifferently supported from either of said bridge and said boom; load carrying means supported from said crab and adapted for vertical movement to and from said crab; hoist means for lifting and lowering said load carrying means; bridge drive means for moving said bridge and further drive means for displacing said boom and said crab respectively.

2. A device according to claim 1 comprising rack means carried by and co-extensive with said runways, respectively; motor driven pinions rotatably carried upon said rolling bridge and in meshing engagement with said rack means thereby forming said bridge driving means; meshing track means secured at least in part to said bridge and extending in parallel relation to said roller tracks thereof; motor-driven toothed gear means rotatably mounted on said crab and in meshing engagement with said meshing track means, thereby forming said further drive means which are thus common to said crab and to said boom for alternatively and selectively moving either of them; selectively operable, releasable crab locking means for immobilizing said crab in at least one position thereof with respect to one of said pairs of roller tracks and selectively operable, releasable boom locking means for rigidly connecting and disconnecting said boom to and from said bridge in at least each one of its overboard projecting position and in its retracted position.

3. A device according to claim 2 comprising at least two electrically interlocked electric motors carried by said bridge and operatively connected to said pinions on either side of said bridge respectively.

4. A device according to claim 2 wherein said runways together with their associated rack means consist each one of aligned runway and rack sections spanning each one two successive posts in substantially flush relationship with the top thereof and separated from each other by said posts respectively, said rack sections having their teeth directed upwards, whereas said motor-driven pinions consist, for each runway, of a pair of synchronously driven parallel pinions provided at the corresponding adjacent end of said bridge and spaced from each other by at least the distance separating two successive rack sections, each pinion being mounted on a drive shaft and secured thereto through a resiliently deformable connection allowing a limited rotation of said pinion in either direction with respect to said shaft.

5. A device according to claim 1 wherein said ship's hull encloses a plurality of successive holds separated from each other by athwartship partition bulkheads located each one between two successive hatches and there is provided one transverse pair of said posts straight above each bulkhead.

6. A device according to claim 1 wherein said runways are slidably connected to at least some of said posts of each row.

7. A device according to claim 1 wherein at least some of the transverse pairs of runway sections spanning two successive posts of each row are vertically movable in either direction for being lowered down to an inoperative position on said deck and each pair of successive posts supporting endwise such a movable runway section are provided with vertical confronting guide means extending substantially the full height of said posts for sliding engagement with the ends of said runway section respectively and comprise pulley-block means with hoisting cable means from which said runway sections are suspended.

8. A device according to claim 7 wherein at least some of said posts adjacent to a lowerable runway section consist each one of a stationary bottom portion the height of which corresponds substantially to that of said runway section and of a folding top portion hingedly connected to said bottom portion.

9. A device according to claim 1 wherein at least the lower portion of each post is of hollow closed shape and extends downwards through and below the weather deck to the bottom of the hull, at least one trap-door being provided in said deck within said lower portion and at least one access door being provided in the wall of the post above and below said deck.

10. A device according to claim 4, wherein each pinion is formed with a central bore fitting said drive shaft and having a recessed circumferential portion constituting an arcuate slot and each resiliently deformable connection comprises at least one key rigidly secured to said drive shaft and projecting therefrom into said slot and spring means interconnecting said pinion and said drive shaft for urging said pinion towards a mean angular rest position.

11. A device according to claim 4 comprising for each rack section a pair of short straight rack segments arranged ahead of the fore end and behind the aft end of said rack section respectively, in parallel, sidewise and lengthwise spaced relationship therewith and having upward directed teeth which are in phase with those of said rack section, each rack segment being formed at its ends remote from said rack section with several successive sharp-pointed teeth the first of which has a reduced height whereas each one of said motor-driven pinions meshing with said rack-sections carries an auxilary pinion formed with sharp pointed teeth for meshing engagement with said rack segments, said auxiliary pinion being coaxially integral with said motor-driven pinion.

12. A device according to claim 1 comprising at least one roller-chain, forming said meshing track means, encompassing lengthwise and supported by said telescoping boom; bracket means integral with said bridge and rigidly connected to at least one part of the lower side of said chain; a pair of automatic winders carried by said bridge above said boom and to which are secured both chain ends respectively to be rolled up thereon; a pair of at least half-round transferable guide members adapted to be alternatively and removably carried at the opposite boom ends respectively and at the opposite bridge ends respectively, and over which said chain returns; a pair of stop members integral with said bridge and adjacent to the opposite ends thereof respectively for engaging and stripping said guide members off said boom during shift thereof in either direction when the relevant end of said boom upon being retracted inside of said bridge passes past the associated stop member, which then supports the corresponding guide member; and at least one sprocket-wheel forming said motor-driven gear means mounted on said crab and meshing with said chain; said crab locking means consisting of at least one-crab-borne movable dog-bolt and of an at least two bolt-clasps integral with said boom adjacent to the opposite ends thereof respectively and adapted to be engaged by said dog-bolts for rigidly connecting and disconnecting said crab to and from said boom.

13. A device according to claim 12 wherein the top side of said telescoping boom is formed lengthwise with channel-like guide means and further channel-like guide means are provided along the arcuate periphery of said guide members in registering relationship with said channel-like guides of said boom for receiving said roller-chain therein, wherein the bottom side of said boom is formed lengthwise with slide means and the link-plates of said roller-chain are formed with outward protruding flanges adapted to be slidingly received and retained in said slide means.

14. A device according to claim 12 wherein each bolt-clasp forms a latch-catch and said dog-bolt is integral with the iron core plunger of a long-pull electro-magnet actuator carried by said crab.

15. A device according to claim 1 comprising at least one electric motor mounted on said crab for driving same; at least one electric motor for hoisting purposes; at least one first automatic winder for electric feed cables, mounted on said bridge, said feed cables being connected to connector means mounted on at least one of said runways; and at least one second automatic winder for electric feed cables mounted on said bridge and the feed cables of which are connected on the one hand to the feed cables of said first winder and on the other hand to said electric motor mounted on said crab.

16. A device according to claim 1, wherein each runway consists of a plurality of substantially aligned runway portions spaced endwise from each other by a small gap and supported each one by a pair of successive posts.

17. A device according to claim 1 comprising a pair of cantilever extension arms provided with roller-tracks along their lower edge and a pair of goose-necked brackets integral with said bridge at the opposite ends thereof respectively and projecting outwards over said runways, said extension arms being each one recessed at their inner end so as to pass around the adjacent runway and thereby to define on the one hand an upper portion overlying said runway and pivoted through a substantially horizontal pin to the corresponding bracket and on the other hand a lower portion beneath said adjacent runway for abutting engagement with the corresponding end of said bridge whereby each extension arm may be selectively swung upwards from an operative overboard projecting position with its roller-tracks joining and aligned with those of said bridge, to a stowed inoperative position wherein said extension arm is folded back athwartships against said bridge.

18. A device according to claim 17 wherein the added lengths of both extension arms exceed the length of said bridge and the free end of each extension arm is forked whereas the pivot pin of one extension arm is at a slight angle to the pivot pin of the other extension arm so that the forked ends may straddle each other when said extension arms are folded back.

19. A device according to claim 1, wherein said ship is provided with a castle and the aft end pair of registering runway sections are lowerable and comprising a pair of registering additional posts for supporting and guiding said lowerable runway sections at their ends remote of said castle and bridge elevator means guidingly mounted between said pair of additional posts and the adjacent pair of intermediate posts supporting the next pair of runway sections respectively.

20. A device according to claim 1 comprising at least one pair of substantially horizontal parallel spaced racks integral and co-extensive with said bridge and said boom respectively; at least one rotary drive shaft mounted on said crab; at least one sliding drive gear slidably and non-rotatably mounted on said drive shaft and adapted to mesh with one of said racks; at least one loose gear carried by said crab and permanently meshing with the other rack; and operator-responsive-coupling means for selectively operatively connecting and disconnecting said drive shaft to and from said rack integral with said bridge, said crab locking means being arranged to rigidly connect and disconnect said crab to and from said bridge.

21. A device according to claim 20 wherein said crab locking means are operatively connected to said coupling means for synchonized operation therewith.

22. A device according to claim 21, wherein said racks are directed downwards, said device further comprising at least one power shaft mounted on said crab and carrying a drive pinion, whereas said drive shaft is slidably mounted on said crab and extends parallel with said power shaft; a second gear rigidly mounted on said drive shaft and permanently meshing with said drive pinion; said sliding gear permanently meshing with said rack integral with said boom; and said loose gear being slidably mounted on said drive shaft and permanently meshing with said rack integral with said bridge; disc clutch means mounted on and coaxial with said drive shaft and said loose gear for operatively connecting and disconnecting this latter to and from said drive shaft upon axially shifting same in selected directions; said operator-responsive coupling means consisting of drive shaft shifting means.

23. A device according to claim 20 wherein said racks are laterally directed and face each other, said loose crab-borne gear meshes with said rack integral with said boom, said drive shaft is substantially vertical with said drive gear permanently meshing with said loose gear, the sliding stroke of said drive gear enabling this latter to be selectively brought into and out of meshing engagement with said rack integral with said bridge; whereas said operator-responsive coupling means consist of drive gear shifting means.

24. A device according to claim 23 wherein said drive gear shifting means and crab-locking means consist of a socket integral with said bridge; a locking bolt slidably mounted on said crab and selectively insertable in said socket and a double-armed rocking lever pivoted to said crab and having one arm engaging said locking bolt and the other arm slidably connected to said drive gear.

25. A device according to claim 24 comprising a second pair of racks integral with said bridge and said boom respectively and a second pair of roller tracks integral with said bridge and boom respectively, both pairs of racks and both pairs of roller-tracks extending in symmetrical relationship on either side of said bridge and boom; at least one motor-reducer set mounted on said crab and provided with two substantially horizontal parallel power shafts issuing from two opposite sides of said set respectively and extending transversely to said boom and bridge, a second drive shaft with a sliding drive gear, a second loose gear, second gear drive shifting means and second crab locking means associated with said second pair of racks in symmetrical relation to the first-named drive shaft with sliding drive gear, loose gear, drive gear shifting means and crab-locking means and operating in the same way in synchronized relation thereto, a pair of bevelled gear boxes mounted on said crab and having each one an input shaft operatively connected to one power shaft and an output shaft operatively connected to one drive shaft; said crab being formed with at least four uprights carrying each one, at their upper free end, a pair of coaxially mounted rollers resting upon one bridge-borne roller-track and upon one neighboring boom-borne roller-track, whereby said crab is suspended from either of the boom and bridge.

26. A device according to claim 22 wherein said drive shaft has a free end and said bridge carries at least one apertured member integral therewith and so disposed that said free end is insertable in the aperture of said apertured member upon shifting of said drive shaft towards the clutching direction in a selected position of said crab, thereby forming said crab-locking means.

27. A device according to claim 26 wherein said drive shaft shifting means comprise an electromagnetic actuator mounted in said apertured member and adapted upon being energized to pull said free end of said countershaft through said aperture; and drawback spring means for urging said countershaft towards its declutched position.

28. A device according to claim 1 comprising at least one motorized winch supported on said bridge and provided with at least one drum for rolling up and paying out the hoisting rope, the axis of said drum being substantially horizontal and at right angles to said telescoping boom; and at least one pair of loose guide pulleys for said hoisting rope, rotatably mounted on said crab with their axes being sucstantially parallel to that of said drum, said pulleys being arranged close to each other in substantially aligned relationship with their swallows registering with one another and said hoisting rope passing therebetween and being reeved over one of them.

29. A device according to claim 28 comprising at least one pair of loose guide sheaves for said hoisting rope rotatively mounted on said bridge on the path of said hoisting rope leading from said drum to said guide pulley with their axes being substantially parallel to that of said drum, said sheaves being arranged in substantially aligned relation and close to each other in substantially the same vertical plane as said guide pulleys and having their swallows registering with each other with said hoisting rope passing therebetween and being reeved over one of them.

30. A device according to claim 29 wherein the axes of each pair of said guide pulleys and the axes of each pair of said guide sheaves are located in two substantially horizontal planes respectively spaced by such a distance that the hoisting rope portion extending between both pairs is substantially parallel to the direction of travel of said crab.

References Cited by the Examiner

UNITED STATES PATENTS

| | | | |
|---|---|---|---|
| 2,363,797 | 11/1944 | Lovfald | 214—15 X |
| 2,396,143 | 3/1946 | Andersen | 214—15 |
| 2,555,297 | 5/1951 | Smith et al. | 214—15 |
| 2,788,905 | 4/1957 | Grove | 214—95 |
| 2,984,367 | 5/1961 | McIntyre | 214—15 |
| 3,077,992 | 2/1963 | Bevard | 214—15 X |

HUGO O. SCHULZ, *Primary Examiner.*

GERALD M. FORLENZA, *Examiner.*